United States Patent
Wasserman et al.

(10) Patent No.: US 7,030,351 B2
(45) Date of Patent: Apr. 18, 2006

(54) SYSTEMS AND METHODS FOR RAPIDLY AUTOMATICALLY FOCUSING A MACHINE VISION INSPECTION SYSTEM

(75) Inventors: Richard M. Wasserman, Kirkland, WA (US); Paul G. Gladnick, Seattle, WA (US); Kim W. Atherton, Kirkland, WA (US)

(73) Assignee: Mitutoyo Corporation, Kawasaki (JP)

( * ) Notice: Subject to any disclaimer, the term of this patent is extended or adjusted under 35 U.S.C. 154(b) by 284 days.

(21) Appl. No.: 10/719,210

(22) Filed: Nov. 24, 2003

(65) Prior Publication Data
US 2005/0109959 A1    May 26, 2005

(51) Int. Cl.
G02B 7/04    (2006.01)
(52) U.S. Cl. .................... 250/201.3; 250/208.1
(58) Field of Classification Search .............. None
See application file for complete search history.

(56) References Cited

U.S. PATENT DOCUMENTS

| 5,790,710 A | 8/1998 | Price et al. |
| 5,892,218 A * | 4/1999 | Ortyn et al. ............. 250/201.3 |
| 2003/0197925 A1 | 10/2003 | Hamborg |

FOREIGN PATENT DOCUMENTS

| EP | 1 381 229 A1 | 1/2004 |
| WO | WO 00/75709 A1 | 12/2000 |

OTHER PUBLICATIONS

QVPAK 3D CNC Vision Measuring Machine Users Guide, published Jan. 2003.
QVPAK 3D CNC Vision Measuring Machine Operation Guide, published Sep. 1996.
"High Speed, Real-Time Machine Vision", Perry West-Automated Vision Systems, Inc., pp 1-38, 2001.
Jan-Mark Geusebroek et al, "Robust Autofocusing in Microscopy", ISIS technical report series, vol. 17, Nov. 2000, pp 1-16.

* cited by examiner

Primary Examiner—Que T. Le
(74) Attorney, Agent, or Firm—Oliff & Berridge, PLC

(57) ABSTRACT

Auto focus systems and methods for a machine vision metrology and inspection system provide high speed and high precision auto focusing, while using relatively low-cost and flexible hardware. One aspect of various embodiments of the invention is that the portion of an image frame that is output by a camera is minimized for auto focus images, based on a reduced readout pixel set determined in conjunction with a desired region of interest. The reduced readout pixel set allows a maximized image acquisition rate, which in turn allows faster motion between auto focus image acquisition positions to achieve a desired auto focus precision at a corresponding auto focus execution speed that is approximately optimized in relation to a particular region of interest. In various embodiments, strobe illumination is used to further improve auto focus speed and accuracy. A method is provided for adapting and programming the various associated auto focus control parameters.

48 Claims, 15 Drawing Sheets

SYSTEMS AND METHODS FOR RAPIDLY AUTOMATICALLY FOCUSING A MACHINE VISION INSPECTION SYSTEM

BACKGROUND OF THE INVENTION

This invention relates to systems and methods for automatically focusing a machine vision inspection system.

2. Description of Related Art

Methods for operating a machine vision inspection system with a camera and stage that are movable relative to one another to focus on and inspect selected features of a workpiece on the stage are generally known. Precision machine vision inspection systems can be used to obtain precise dimensional measurements of inspected objects and to inspect various other object characteristics. Such systems may include a computer, a camera and optical system and a precision stage that is movable in multiple directions to allow the camera to scan the features of a workpiece that is being inspected. One exemplary prior art system, of a type that can be characterized as a general-purpose "off-line" precision vision system, is the commercially available QUICK VISION™ series of vision inspection machines and QVPAK™ software available from Mitutoyo America Corporation (MAC), located in Aurora, Ill. The features and operation of the QUICK VISION™ series of vision inspection machines, and the QVPAK™ software are generally described, for example, in the QVPAK 3D CNC Vision Measuring Machine Users Guide, published January 2003 and the QVPAK 3D CNC Vision Measuring Machine Operation Guide, published September 1996, each of which is incorporated herein by reference in its entirety. This product, as exemplified, for example, by the QV-302 Pro model, is able to use a microscope-type optical system to provide images of a workpiece at various magnifications.

Such general-purpose "off-line" precision vision systems often include a programmable illumination system and a lens turret with lenses of various magnifications, for example, in order to increase their versatility and provide the ability to rapidly change their configuration and imaging parameters in order to perform a wide variety of inspection tasks. There is a common need to inspect various types of objects or inspection workpieces, or various aspects of a single workpiece, using various combinations of the magnifications and the programmable illumination settings.

General purpose precision machine vision inspection systems, such as the QUICK VISION™ system, are also generally programmable and operable to provide automated video inspection. It is generally desirable that such systems include features and tools that simplify the programming and operation of such systems, such that operation and programming can be performed reliably by "non-expert" operators. For example, U.S. Pat. No. 6,542,180, which is incorporated herein by reference in its entirety, teaches a vision system that uses automated video inspection, including operations in which the lighting used to illuminate a workpiece feature is adjusted based on a plurality of selected regions of an image of the workpiece feature.

As taught in the '180 patent, automated video inspection metrology instruments generally have a programming capability that allows an automatic inspection event sequence to be defined by the user for each particular workpiece configuration. The programming capability also typically provides the ability to store and/or output the results of the various inspection operations. Such programming can be implemented either in a deliberate manner, such as text-based programming, for example, or through a recording mode that progressively "learns" the inspection event sequence by storing a sequence of machine control instructions corresponding to a sequence of inspection operations performed by a user, or through a combination of both methods. Such a recording mode is often referred to as "learn mode" or "training mode".

In either technique, the machine control instructions are generally stored as a part program that is specific to the particular workpiece configuration. The ability to create part programs with instructions that automatically perform a predetermined sequence of inspection operations during a "run mode" of operation provides several benefits, including enhanced inspection repeatability, as well as the ability to automatically execute the same part program on a plurality of compatible machine vision inspection systems and/or at a plurality of times.

The exemplary QUICK VISION™ systems described above, as well as a number of other commercially available general purpose "off-line" vision systems, typically use conventional PC-based image acquisition accessories or components and conventional PC-based computer operating systems, such as the Windows™ operating system, to provide their methods of operation, including their methods of operating during a sequence of auto focus operations.

In general, during a sequence of auto focus operations the camera moves through a range of positions along a Z-axis and captures an image at each position. For each captured image, a focus metric is calculated and related to the corresponding position of the camera along the Z-axis at the time that the image was captured.

One known method of auto focusing is discussed in "Robust Auto focusing in Microscopy", by Jan-Mark Geusebroek and Arnold Smeulders in ISIS Technical Report Series, Vol. 17, November 2000, which is incorporated herein by reference, in its entirety. In order to determine a Z-axis position of the camera that corresponds to an auto focus image, the discussed method estimates a position of the camera along a Z-axis based on a measured amount of time during which the camera moves from a known original position on the Z-axis at a constant velocity along the Z-axis, until the image is acquired. During the constant velocity motion, the auto focus images are captured at 40 ms intervals (video rate). The disclosed method teaches that the video hardware captures frames at a fixed rate, and that the sampling density of the focusing curve can only be influenced by adjusting the stage velocity.

Another known auto focus method and apparatus is described in U.S. Pat. No. 5,790,710, which is incorporated herein by reference, in its entirety. In the '710 patent a piezoelectric positioner is utilized in conjunction with a conventional motor-driven motion control system to control the Z-axis position. The motor-driven motion control system provides a relatively coarser resolution positioning over a full range of travel, while the piezoelectric positioner provides fast and high resolution positioning over a limited range about the nominal position established by the motor-driven system. The piezoelectric positioner provides relatively improved auto focus speed and resolution. The '710 patent further discloses using strobe lighting during auto focus operations. The '710 patent teaches acquiring auto focus images at 60 Hz.

In one embodiment, the "image was strobed near the end of the video field after the piezoelectric focus had stopped at its new position". The '710 patent also suggests an alternative in which the position has to be moved at a constant velocity and the image frozen with a strobe. In each case, because the strobe shortens the effective exposure time of the camera, part of the normal integration period for acquiring a camera frame image can be used for moving to a new position before firing the strobe later within that integration period.

SUMMARY OF THE INVENTION

The auto focus methods referred to above provide auto focus images at conventional camera frame rates and provide relatively fast auto focus capability. Relatively fast auto focus capability is also provided in a variety of so called "on-line" or "in-line" machine vision inspection systems, which are specifically designed to achieve a high throughput for a specific set of inspection operations performed repeatedly on a particular type of mass-produced part, in a particular operating environment. Compared to the previously described general purpose precision machine vision inspection systems, such on-line machine vision inspection systems need to change the parameters surrounding their inspection operations much less frequently. Furthermore, flexibility is generally less important than high speed operation. Thus, such systems have typically relied on specialized hardware configurations, and specialized programming, in order to provide high speed operations, including relatively fast auto focus capability.

Another problem typical for related systems and methods is that machine vibrations, distortions and related auto focus position measurement errors occur when various vision machine elements are abruptly stopped just prior to an auto focus image acquisition.

The various previously described known systems and methods for performing auto focus operations suffer from either auto focusing speed limitations; auto focusing precision limitations; costly, specialized, and/or relatively inflexible hardware; and/or the lack of a suitable method for simply and reliably adapting and programming the auto focus operations for a variety of different workpieces or workpiece features, particularly when the auto focus operations include the use of strobed lighting. An auto focus system and methods that can overcome these various disadvantages and limitations separately or in combination is desirable.

In contrast to each of the previously described known systems and methods for performing auto focus operations, the present invention provides high speed and high precision auto focusing suitable for a general purpose precision machine vision inspection system, while using relatively low-cost and flexible hardware. For example, relatively low-cost commercially available PC-compatible machine vision components and motion components may be used, along with conventional PC-based computer operating systems. Specialized motion elements such as piezoelectric actuators, or the like, and their associated control elements are not required in order to provide high precision in various exemplary embodiments of the systems and methods for rapidly automatically focusing an image capturing device according to this invention.

A relatively low-cost commercially available camera may be used to provide a reduced readout pixel set according to this invention. The reduced readout pixel set corresponds to substantially less than the full field of view of the camera along at least one dimension of the field of view of the camera. The pixel values of the reduced readout pixel set of an image may be output to the control system portion in a time that is substantially less than a time required for outputting the full pixel set corresponding to a full field of view of the camera. Thus, a repetition rate for acquiring images and storing the data corresponding to the reduced readout pixel set is substantially faster than the rate associated with acquiring images and storing the data corresponding to a full pixel set for the entire field of view of the camera.

Conventional PC-based computer operating systems and vision and motion components generally contain various uncontrolled timing latencies, asynchronously-timed operations, and the like. Existing auto focus systems and methods for such systems and components have typically overcome these various unpredictable timing relations and variations in a way that is relatively slow to execute, in order to provide adequate timing margins and reliably provide a desired level of focusing accuracy or repeatability. Alternatively, existing auto focus systems and methods have accepted relatively reduced precision, repeatability or reliability. Such auto focus speed problems have not been adequately addressed by prior auto focus systems and methods implemented using such PC-based computer operating systems and components, and such auto focus systems and methods are deficient in this regard. Thus, in various exemplary embodiments of the systems and methods for rapidly automatically focusing an image capturing device according to this invention, adequate timing margins and reliable levels of focusing accuracy, precision and repeatability are achieved while rapidly executing auto focus operations without dependence on the timing latencies of a PC.

In addition, various exemplary embodiments of the systems and methods according to this invention provide auto focus systems and methods that can be simply and reliably adapted, operated and programmed for a variety of different workpieces or workpiece features, including embodiments where the auto focus operations include the use of strobed lighting. Furthermore, various exemplary embodiments of the systems and methods according to this invention provide systems and methods that allow such adaptation, operation and programming to be performed reliably by "non-expert" operators during manual inspection operations and during various training mode operations.

It should be appreciated that the systems and methods for rapidly automatically focusing an image capturing device according to this invention are particularly advantageous for use in precision auto focus operations usable in machine vision metrology and inspection systems. The systems and methods according to this invention generally provide auto focus accuracy and repeatability that are a small percentage of the depth of field provided by an imaging lens. This is particularly important for a precision machine vision inspection system used for metrology. It should be appreciated that the auto focus systems utilized by many other types of systems primarily provide clear images, and are often comparatively crude in terms of their repeatability relative to the depth of field of an imaging lens. This is because a clear image is provided over a relatively large portion of the depth of field.

This invention provides systems and methods for automatically focusing an image capture device with high speed and high precision using a reduced readout pixel set.

This invention separately provides systems and methods for defining a reduced readout pixel set that is actually output for a number of auto focus images to increase the achievable rate of auto focus image acquisition.

This invention separately provides systems and methods for automatically focusing an image capture device to provide high speed and high precision using a relatively limited number of setup conditions and/or parameters that are not automatically determined.

This invention separately provides systems and methods for acquiring auto focus images while moving the camera relative to the workpiece.

This invention separately provides systems and methods for acquiring auto focus images while accelerating the camera relative to the workpiece.

This invention separately provides systems and methods for acquiring at high speed various auto focus images while rapidly moving the camera and/or workpiece in a manner that does not give rise to potential machine vibrations, distortions and/or related auto focus position measurement errors that otherwise tend to occur if various vision machine elements are abruptly stopped just prior to auto focus image acquisition.

This invention separately provides systems and methods for determining the reduced readout pixel set portion of an image frame that is actually output for a number of auto focus images based on the size and location of a region of interest of a workpiece.

This invention separately provides various graphical user interface elements usable with the systems and methods for determining a desired alignment or overlap between a portion of an image frame that is actually output for a number of auto focus images and a region of interest of a workpiece.

This invention separately provides systems and methods for moving the camera relative to the workpiece at a speed that is determined based on an achievable repetition rate of auto focus image acquisition and a desired focus curve sample density.

This invention separately provides systems and methods for determining the effective exposure time of an auto focus image by strobe light illumination, and for selecting a strobe duration that limits the displacement of a moving camera within a desired range during the effective exposure time of the auto focus image.

This invention separately provides systems and methods for determining a strobe light power level used during a strobe duration based on a continuous illumination power setting that is known to produce acceptable image characteristics over an effective exposure duration that is longer than the strobe duration.

This invention separately provides systems and methods for determining the portion of an image frame that is actually output for a number of auto focus images based on a desired minimum size of a region of interest that determines corresponding maximum achievable sample rate.

This invention separately provides systems and methods for determining a maximum camera motion speed based on the maximum achievable sample rate and a desired focus curve sample density that is related to a desired focus accuracy.

This invention separately provides systems and methods for determining a strobe duration based on a maximum allowable camera displacement desired during an effective auto focus image exposure time.

This invention separately provides systems and methods for determining a light power level used during the strobe duration based on a continuous illumination power setting that is known to produce acceptable image characteristics over an effective exposure duration that is longer than the strobe duration to achieve a desired auto focus precision at a corresponding auto focus execution speed that is approximately optimized in relation to a particular region of interest for the auto focus operations.

This invention separately provides systems and methods that provide a strobe lighting controller that is easily interfaced to various conventional PC-compatible machine vision components and that receives various control signals and provides controlled illumination power levels, fast operation and predictable timing for various auto focus operations.

This invention separately provides systems and methods that provide a strobe lighting controller that is operable to control continuous illumination operations.

This invention separately provides systems and methods that provide the strobe lighting controller that is installable as a retrofit to various existing machine vision systems, which can then implement various improved auto focus operations according to this invention.

In various exemplary embodiments of the systems and methods according to this invention, when the camera is moving during an auto focus image acquisition, at least one position value related to the imaging distance for that auto focus image is captured in relation to the effective exposure time of the auto focus image. In various exemplary embodiments, this is done to provide the auto focus image distance with high precision, reliability and/or certainty.

In various exemplary embodiments of the systems and methods according to this invention, a vision inspection system that incorporates various improved auto focus operations according to this invention is placed into a training or learning mode to determine parameters such as a selected lens, the dimensions and location of a region of interest, the dimensions and location of a reduced readout pixel set, illumination settings, auto focus scan speed and range, and the like, for more quickly and accurately automatically focusing on a particular workpiece.

In various exemplary embodiments of the systems and methods according to this invention, when the vision inspection system is placed into a training or learning mode, a graphical user interface (GUI) is provided for an operator to use in connection with defining auto focusing operations and some or all of the above-specified parameters are defined and/or determined. In various exemplary embodiments of the systems and methods according to this invention a demonstration of the results of the defined auto focusing operations is conveniently provided in the training mode, for verification of the results. In various exemplary embodiments, the operator initiates the demonstration through a feature of the GUI. In various exemplary embodiments of the systems and methods according to this invention, part program instructions are then created to use predetermined, defined, or newly determined parameters or the like, in conjunction with zero, one or more other operations, to speed up and/or enhance the robustness of the operations which automatically determine an estimated best focus position and/or focus on a region of interest on a workpiece.

In various exemplary embodiments of the systems and methods according to this invention, one or more focus values are determined only for a limited region of interest captured in a reduced readout pixel set of various auto focus images. In various exemplary embodiments such focus values allow an estimated best focus position to be determined with high precision and at high speed using a computer or controller of the machine vision system.

In various exemplary embodiments of the systems and methods according to this invention, the estimated best focus position is used as an inspection coordinate for a feature of the region of interest, and inspection operations are continued at another position on the workpiece.

In various exemplary embodiments of the systems and methods according to this invention, the estimated best focus position is used to select an existing auto focus image of the region of interest that is used for inspection in the region of interest.

In various exemplary embodiments of the systems and methods according to this invention, the estimated best focus position is relatively more approximate when a relatively lower accuracy is acceptable and relatively less approximate when a relatively higher accuracy is required.

In various exemplary embodiments of the systems and methods according to this invention, a machine vision system automatically recalls and/or sets various auto focus parameters for a particular workpiece based on a part program determined during a training mode, executes various auto focus operations based on the various auto focus parameters, automatically locates an estimated best focus position for the workpiece, and obtains or defines at least one desirable inspection image of the workpiece corresponding to the located estimated best focus position.

In various exemplary embodiments of the systems and methods according to this invention, a machine vision system automatically recalls and/or sets various auto focus parameters for a particular workpiece based on a part program determined during a training mode; executes various auto focus operations based on the various auto focus parameters, including using an initial set of strobe illumination parameters to acquire at least one image and refining at least one strobe illumination parameter based on automatically evaluating at least one image characteristic of the at least one image; automatically locates an estimated best focus position for the workpiece, and acquires or defines at least one desirable inspection image of the workpiece.

In various exemplary embodiments of the systems and methods according to this invention, the inspection image is obtained using the refined strobe illumination parameters at the located estimated best focus position.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of the systems and methods of this invention will be described in detail, with reference to the following figures, wherein.

DETAILED DESCRIPTION OF EXEMPLARY EMBODIMENTS

Figure 1:
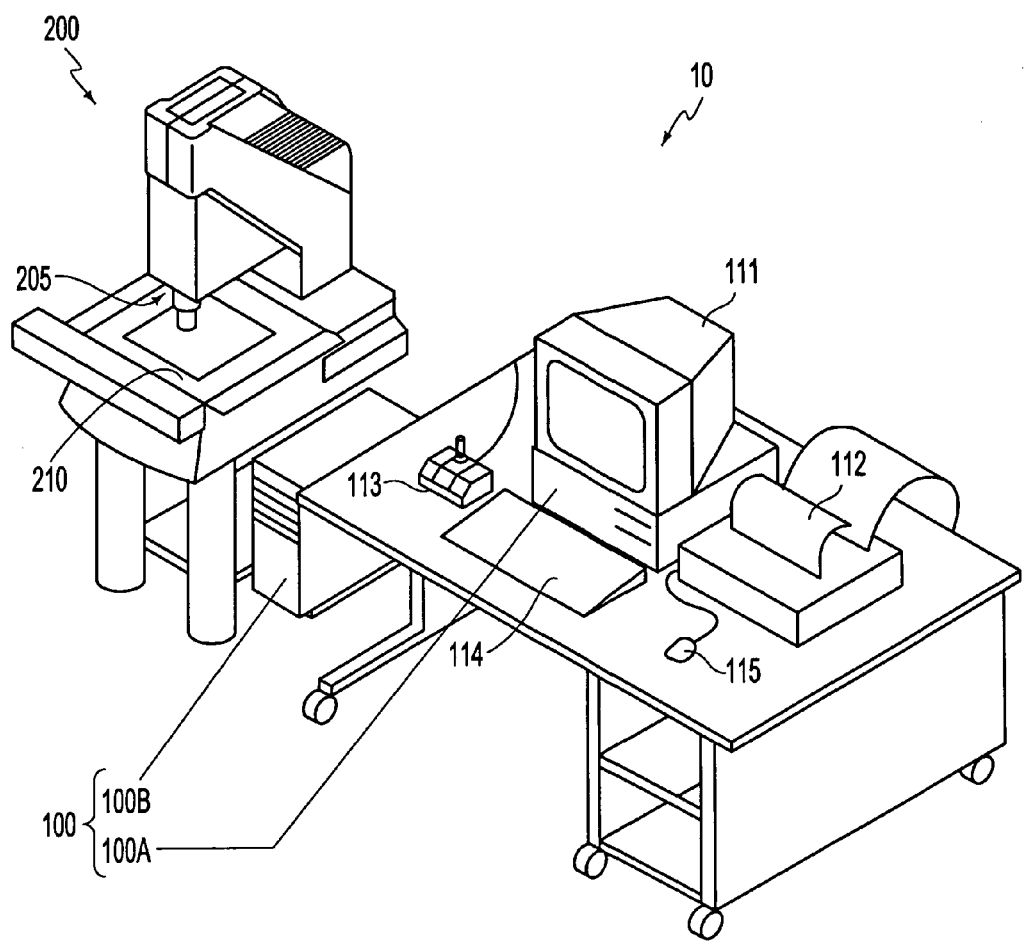
FIG. 1 is a diagram of one exemplary general purpose machine vision inspection system.

FIG. 1 is a block diagram of one exemplary embodiment of a general purpose programmable machine vision inspection system 10 in accordance with this invention. The machine vision inspection system 10 includes a vision measuring machine 200 that is operably connected to exchange data and control signals with a control system 100. The control system 100 is further operably connected to exchange data and control signals with one or more of a monitor 111, a printer 112, a joystick 113, a keyboard 114, and/or a mouse 115. The vision measuring machine 200 includes a moveable workpiece stage 210 and an optical imaging system 205 which may include a zoom lens or a number of interchangeable lenses. The zoom lens or interchangeable lenses generally provide various magnifications for the images provided by the optical imaging system 205.

The joystick 113 can typically be used to control the movement of the movable workpiece stage 210 in both the X and Y directions, which are generally parallel to the focal planes of the optical imaging system 205, and the movement direction component of the movable optical imaging system 205 in the Z or focus direction. Frequently, the deflection that controls the Z axis is a rotary deflection component of a handle or knob of the joystick 113. The joystick 113 may be provided in a form other than that shown, such as any visual representation or widget on the monitor 111 which is intended to function as a "virtual motion control device" of the machine vision inspection system 10 and is controllable through any computer input device, such as the mouse 115 or the like.

Figure 2:
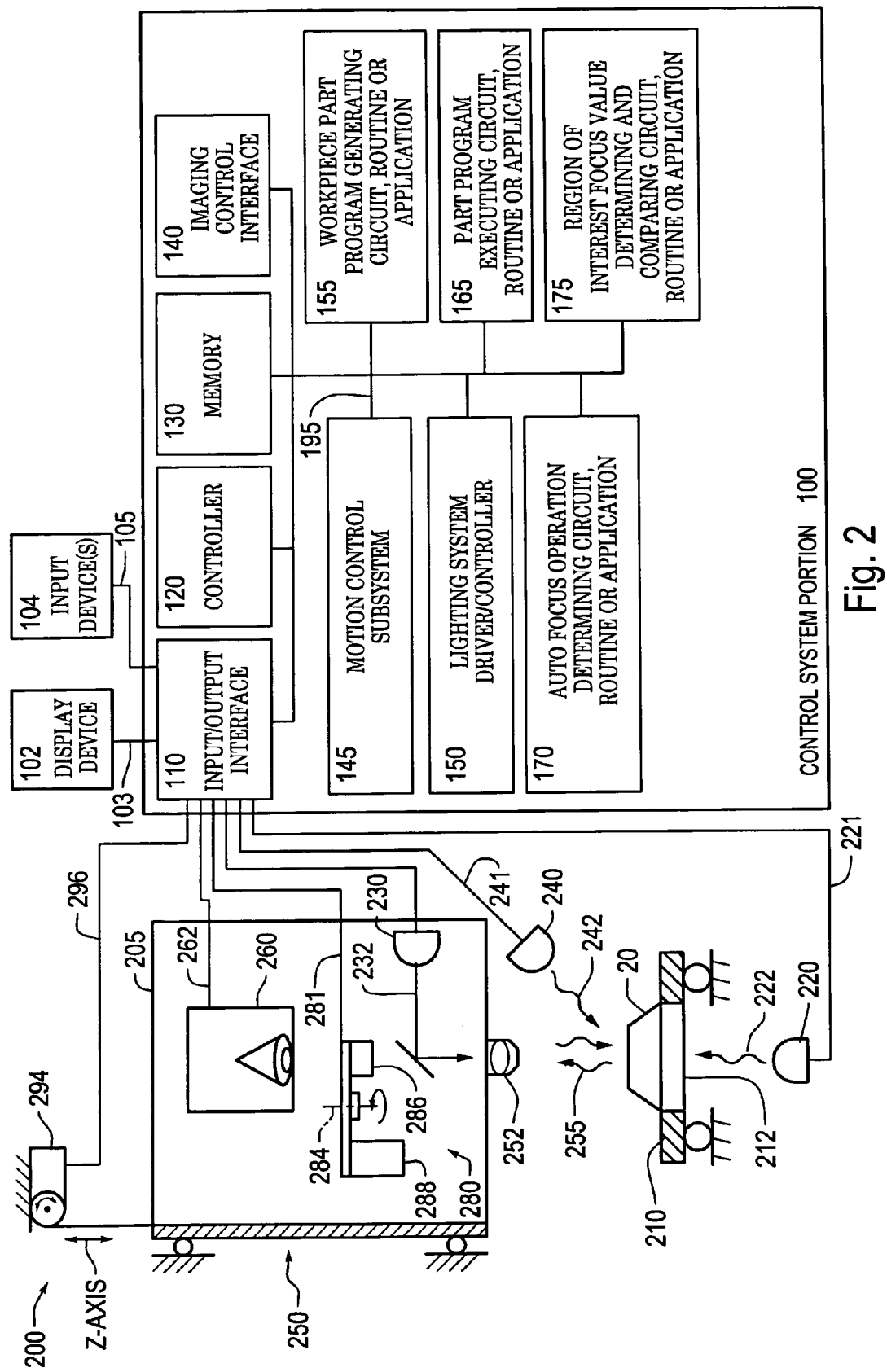
FIG. 2 is a block diagram showing in greater detail one exemplary embodiment of the control system portion and the vision components portion of the machine vision inspection system of FIG. 1.

FIG. 2 shows in greater detail one exemplary embodiment of the machine vision inspection system 10, the vision measuring machine or vision components portion 200 and the control system or control system portion 100 of FIG. 1. As shown in FIG. 2, the control system portion 100 controls the vision components portion 200. The vision components portion 200 includes an optical assembly portion 250, light sources 220, 230 and 240, and the workpiece stage 210 having a central transparent portion 212. The workpiece stage 210 is controllably movable along X and Y axes that lie in a plane that is generally parallel to the surface of the stage where a workpiece 20 may be positioned. The optical assembly portion 250 includes a camera system 260, an interchangeable objective lens 252, a turret lens assembly 280, and the coaxial light source 230. The optical assembly portion 250 is controllably movable along a Z axis that is generally orthogonal to the X and Y axes by using a controllable motor 294. Each of the X, Y and Z axes of the machine vision inspection system 10 are instrumented with respective X, Y and Z axis position encoders (not shown) that provide X, Y and Z position information to the control system portion 100 over suitable signal and/or control lines (not shown).

The workpiece 20 to be imaged using the machine vision inspection system 10 is placed on the workpiece stage 210. One or more of the light sources 220, 230 or 240 emits source light 222, 232, or 242, respectively, that is usable to illuminate the workpiece 20. Light emitted by the light sources 220, 230 and/or 240 illuminates the workpiece 20 and is reflected or transmitted as workpiece light 255, which passes through the interchangeable objective lens 252 and one of a lens 286 or a lens 288 of the turret lens assembly 280 and is gathered by the camera system 260. The image of the workpiece 20, captured by the camera system 260, is output through a signal and control line 262 to the control system portion 100. In various exemplary embodiments according to this invention, the camera system 260 is operable to output a reduced readout pixel set that is smaller than the full field of view of the camera in a time that is shorter than a time required to output a full pixel set corresponding to the full field of view. In various exemplary embodiments, this is for the purpose of decreasing the overall time of auto focus operations according to this invention.

The light sources 220, 230, and 240 that are used to illuminate the workpiece 20 can include the stage light 220, the coaxial light 230, and the surface light 240, such as a ring light or a programmable ring light, connected to the control system portion 100 through signal lines or busses 221, 231 and 241, respectively. In various exemplary embodiments of the systems and methods according to this invention, one of more of the light sources 220–240 are usable in a strobe illumination mode of operation. In such exemplary embodiments it is desirable to provide lights sources operable to provide a combination of a very fast light source response time (in the microsecond or sub-microsecond range) and suitable optical power levels. Thus, in various exemplary embodiments, the light source(s) that is (are) used for strobing include a high intensity LED, such as one of the LEDs in the Luxeon™ product line, available from Lumileds Lighting, LLC, of San Jose, Calif. In various exemplary embodiments, the light source(s) that is(are) used for strobing include a blue LED with a wavelength of approximately 470 nm. However, any wavelength within the sensing range of the camera is used in various exemplary embodiments. In general, any of the previously described light sources 220–240 may be implemented using such an LED in various exemplary embodiments. In various exemplary embodiments of the systems and methods according to this invention, one of more of the light sources 220–240 are usable in both a continuous illumination mode and in a strobe illumination mode of operation.

As a primary optical assembly of the machine vision inspection system 10, the optical assembly portion 250 may include, in addition to the previously discussed components, other lenses, and other optical elements such as apertures, beamsplitters and the like, such as may be needed for providing coaxial illumination, or other desirable machine vision inspection system features. The control system portion 100 rotates the turret lens assembly 280 along axis 284, between at least the first and second turret lens positions in order to provide various magnifications, based on control signals transmitted over a signal line or bus 281.

The distance between the workpiece stage 210 and the optical assembly portion 250 can be adjusted to change the focus of the image of the workpiece 20 captured by the camera system 260. In particular, in various exemplary embodiments of the machine vision inspection system 10, the optical assembly portion 250 is movable in the vertical Z axis direction relative to the workpiece stage 210 using the controllable motor 294 that drives an actuator, a connecting cable, or the like, to move the optical assembly portion 250 along the Z axis. The term Z axis, as used herein, refers to the axis that is intended to be used for focusing the image obtained by the optical assembly portion 250. The controllable motor 294, when used, is connected to the control system portion 100 via a signal line 296.

As shown in FIG. 2, in various exemplary embodiments, the control system portion 100 includes a controller 120, an input/output interface 110, a memory 130, an imaging control interface 140, a motion control subsystem 145, a lighting system driver/controller 150, a workpiece part program generating circuit, routine or application 155, a part program executing circuit, routine or application 165, an auto focus operation determining circuit, routine or application 170, and a region of interest focus value determining and comparing circuit, routine or application 175, which are interconnected by one or more data and/or control busses and/or application programming interfaces 195. It should be appreciated that such circuits, routines or applications encompass hard-wired circuits, software circuits, subroutines, objects, operations, application programming interfaces, managers, applications, or any other known or later-developed hardware or software structure.

In various exemplary embodiments, the memory portion 130 stores data and/or "tools" usable to operate the vision system components portion 200 to capture or acquire an image of the workpiece 20 such that the acquired image of the workpiece 20 has desired image characteristics. The memory portion 130 may further store data and/or video tools usable to operate the machine vision inspection system 100 to perform various inspection and measurement operations on the acquired images, either manually or automatically, and to output the results through the input/output interface 130 by way of data and/or control busses and/or application programming interfaces 195. The memory portion 130 may also contain data defining a graphical user interface operable through the input/output interface 110 by way of data and/or control busses and/or application programming interfaces 195. Such an embodiment is exemplified by the previously mentioned QUICK VISION™ series of vision inspection machines and the QVPAK™ software, for example.

The signal lines or busses 221, 231 and 241 of the stage light 220, the coaxial light 230, and the surface light 240, respectively, are all connected to the input/output interface 110. A control signal line or bus 281 of the turret lens assembly 280 is also connected to the input/output interface 110. Respective signal and/or control lines (not shown) of the respective X, Y and Z axis position encoders (not shown) are also connected to the input/output interface 110. The signal and control line 262 from the camera system 260 and the signal line 296 from the controllable motor 294 are also connected to the input/output interface 110. In addition to carrying image data, the signal and control line 262 may carry various signals from the controller 120 that, in various exemplary embodiments according to this invention, set an image acquisition pixel range for the camera, initiate an image acquisition camera operation sequence, or the like.

One or more display devices 102, such as the monitor 111 and the printer 112 and one or more input devices 104, such as the devices 113–115, can also be connected to the input/output interface 110. The display devices 102 and input devices 104 can be used to view, create and/or modify part programs, to view the images captured by the camera system 260, to view and/or modify various GUI elements and widgets usable to monitor and control the vision system components portion 200 and/or to directly control the vision system components portion 200. In a fully automated system having a predefined workpiece program, the display devices 102 and/or one or more of the input devices 104 may be omitted.

The control system portion 100 is usable to determine image acquisition settings or parameters and/or acquire an image of the workpiece 20 such that the input image of the workpiece 20 has desired image characteristics in a region of interest that includes a workpiece feature to be inspected. For example, various exemplary embodiments of auto focus systems and methods according to this invention are usable in conjunction with the control system portion 100 to establish desired image characteristics that depend on the quality of focus in the region of interest that includes the workpiece feature to be inspected. In various exemplary embodiments, when a user uses the machine vision inspection system 10 to create a workpiece image acquisition program for the workpiece 20 according to this invention, the user generates workpiece program instructions either by explicitly coding the instructions automatically, semi-automatically, or manually, using a workpiece programming language, or by generating the instructions by moving the machine vision inspection system 100 through an image acquisition training sequence such that the workpiece program instructions capture operations and settings defined according to the training sequence.

These workpiece imaging instructions are encoded by the workpiece part programming generating circuit, routine or application 155 and transmitted to other components through data and/or control busses and/or application programming interfaces 195. The physical movements are controlled by the motion control subsystem 145. In order to achieve control of the physical movements of, for example, the camera system 260, the motion control subsystem 145 receives position information from the X, Y and Z axis position encoders and transmits position altering control signals via data and/or control busses and/or application programming interfaces 195. In general, these instructions will cause the machine vision inspection system 10 to manipulate the workpiece stage 210 and/or the camera system 260 such that a particular portion of the workpiece 20 is within the field of view of the camera system 260 and will provide a desired magnification, a desired focus state and a desired illumination. These actions are executed by the part program executing circuit, routine or application 165 by way of data and/or control busses and/or application programming interfaces 195. This process may be repeated for multiple images in a set of images that are to be captured for inspecting a workpiece.

In various exemplary embodiments, for each auto focus image according to this invention, alternatively referred to as a focus image herein, and for the resulting desired inspection image, the control system portion 100 will then command the camera system 260 to capture an image of the workpiece 20, and output at least an image portion corresponding to a region of interest of the workpiece 20 in the captured image, to the control system portion 100. These functions are controlled by the imaging control interface 140 using signals passing between the various components over data and/or control busses and/or application programming interfaces 195. In particular, in various exemplary embodiments, the camera system 260 reads out the output pixel values of at least an image portion corresponding to a portion of the region of interest through the input/output interface 110, and they are converted to digital values if they are not already in that form, and stored in the memory 130 under control of the controller 120. In various exemplary embodiments, the portion of the region of interest corresponding to the image portion is a substantial portion of the region of interest. In various exemplary embodiments, the controller 120 causes the captured image to be displayed on one of the display devices 102.

In particular, in various exemplary embodiments, a camera system 260 is used that is operable to output at least one configuration of a reduced readout pixel set that is smaller than the full field of view of the camera system 260. In various exemplary embodiments, this is done in order to provide a repetitive image acquisition and output rate that is significantly faster than a standard repetitive image acquisition rate associated with one or more fields corresponding to the full field of view of the camera system 260. In various exemplary embodiments the camera systems 260 is a digital camera system that outputs digital pixel values. In various exemplary embodiments of this type, the camera system 260 is implemented using a Redlake MEGAPLUS Camera, Model ES 310/T, commercially available from Redlake, 11633 Sorrento Valley Road, San Diego, Calif. 92121-1010 USA, or a CCD camera having similar and/or sufficient capabilities according to this invention. Also, in various exemplary embodiments of this type, a framegrabber included in the imaging control interface 140 is implemented using a Matrox Meteor-II/Digital framegrabber, commercially available from Matrox Electronic Systems Ltd., of Quebec, Canada, or a framegrabber card having similar and/or sufficient capabilities according to this invention.

In various other exemplary embodiments, the camera system 260 outputs the pixel values as analog signals and the signals are input to the imaging control interface 140, which includes a framegrabber, or the like, that is suitable for converting the analog pixels values to digital pixel values. In various exemplary embodiments of this type, the camera system 260 is implemented using a Pulnix™-6705AN Camera, commercially available from JAI Pulnix, Inc., 1330 Orleans Dr., Sunnyvale, Calif. 94089 USA, or a CCD camera having similar and/or sufficient capabilities according to this invention. In various exemplary embodiments, such components are used in combination and with various other components disclosed herein, including the strobe light controller described with reference to FIG. 5, to provide high speed and high precision auto focus systems and methods according to this invention.

In various exemplary embodiments, the control system portion 100 is further usable to automatically inspect workpiece features in such workpiece inspection images, and to store and/or output the inspection results. In various exemplary embodiments, the workpiece inspection instructions are encoded by the workpiece part programming generating circuit, routine or application 155 and transmitted to other components as needed, through data and/or control busses and/or application programming interfaces 195.

In various exemplary embodiments, when a user uses the machine vision inspection system 10 to create at least a portion of a workpiece image inspection program for the workpiece 20 according to this invention, the user generates workpiece program instructions either by explicitly coding the instructions automatically, semi-automatically, or manually, using a workpiece programming language, or by generating the instructions by moving and/or controlling the machine vision inspection system 10 through an image inspection training sequence such that the workpiece part program generating circuit, routine or application 155 generates workpiece program instructions that capture operations and settings determined according to the training sequence. In various exemplary embodiments according to this invention, certain auto focus operations and settings are determined by auto focus operations determining circuit, routine of application 170, and incorporated into the generated workpiece program instructions. In various exemplary embodiments, the operation of the auto focus operation determining circuit, routine of application 170 is merged and/or indistinguishable from the operation of the workpiece part program generating circuit, routine or application 155. In various exemplary embodiments, these inspection instructions, when executed by the part program executing circuit, routine or application 165, will cause the machine vision inspection system 10 to automatically perform various inspection operations on the image.

In various exemplary embodiments, one or more of the various operations described above is repeated for multiple images in a set of images used to inspect a workpiece 20. In various exemplary embodiments, various known or later developed machine vision system "tools" are stored in the memory portion 130, as previously described. In various exemplary embodiments, these tools are used in performing one or more of the various foregoing manual or training sequence operations. A few examples of video tools usable for various workpiece imaging and/or inspection operations are disclosed in U.S. patent application Ser. Nos. 09/736, 187, 09/921,886, and U.S. Pat. No. 6,542,180, each of which is incorporated herein by reference in its entirety.

Additional exemplary known tools and methods usable for determining auto focus settings and for performing auto focus operations to obtain a desired focus state for an inspection image are evident in commercial machine vision inspection systems such as the QUICK VISION™ series of vision inspection machines, the associated QVPAK™ software, and the related incorporated documentation as discussed above. Such tools include various exemplary graphical region-of-interest indicating widgets, user interfaces, and training mode menu elements and behavior, that are usable in various exemplary embodiments of the systems and methods according to this invention. Such graphical region-of-interest indicating widgets, user interfaces, and training mode menu elements and behavior are incorporated herein by reference.

As previously mentioned, in various exemplary embodiments of the systems and methods according to this invention, in order to control the physical movements of the machine vision inspection system 10, the motion control subsystem 145 receives position information from the X, Y and Z axis position encoders and transmits position altering control signals via data and/or control busses and/or application programming interfaces 195. In various exemplary embodiments according to this invention, X, Y and Z axis position values are tracked in the motion control subsystem 145 of the control system portion 100, and the motion control subsystem 145 is operable to latch the position values in response to a control signal provided by another portion of the control system portion 100.

In various exemplary embodiments according to this invention, such a latching control signal is provided to the motion control subsystem 145 in relation to the effective exposure time of a corresponding auto focus image. In various exemplary embodiments, at least the corresponding Z-axis value is then latched and stored by the control system portion 100 in relation to that auto focus image, for subsequent use in determining an estimated best focus position according to this invention.

In various exemplary embodiments, one or more of the previously described operations are performed by a motion control subsystem 145 that includes a Galil motion control card #DMC-1730, commercially available from Galil Motion Control, Inc., of Rocklin, Calif., or a motion control card having similar and/or sufficient capabilities according to this invention. In various exemplary embodiments, such components are used in combination with one or more other component disclosed herein, including the strobe light controller described with reference to FIG. 5, to provide high speed and high precision auto focus systems and methods according to this invention.

In various exemplary embodiments of the systems and methods according to this invention, the lighting system driver/controller 150 controls and drives the illumination of the machine vision inspection system 10. In various exemplary embodiments, the illumination system operates to provide relatively continuous illumination. Relatively continuous illumination is particularly suitable for manual operations and training mode operations of the machine vision inspection system 10. In various other exemplary embodiments, the illumination system operates to provide a strobe illumination capability. In various other exemplary embodiments, the illumination system operates to provide both continuous illumination and strobing capability through the same light sources. In various exemplary embodiments, the lighting system driver/controller 150 controls and drives the illumination. In various exemplary embodiments according to this invention, the lighting system driver/controller 150 includes the strobe light control system 500, described below with reference to FIG. 5.

In various exemplary embodiments, the auto focus operation determining circuit, routine or application 170 exchanges data and/or control signals with one or more other elements of the control system portion 100. In various exemplary embodiments, this is done in order to determine a desirable combination of auto focus image acquisition operations and/or settings corresponding to a desirable combination of auto focus speed and accuracy for determining an estimated best focus position for a region of interest of a workpiece in approximately the shortest practical time that can provide the desired precision for the estimated best focus position.

For example, in various exemplary embodiments, the systems and methods according to this invention determine compatible and/or interrelated operations and settings related to three auto focus parameters or characteristics that control how rapidly an auto focusing operation according to this invention is performed. In various exemplary embodiments, these auto focus parameters are the size of a region of interest for the auto focus operation, the rate at which the auto focus images are acquired, and the speed at which the camera scans along the Z-axis direction while acquiring auto focus images.

In various exemplary embodiments, the location and size of the region of the interest is based in particular on a specific operator input, for example, corresponding to the location and size of the region of interest indicating portion of a GUI auto focus tool widget that is located and sized by an operator. Some exemplary GUI auto focus tools and auto focus tool GUI widgets and regions of interest are discussed below with reference to FIGS. 8–11.

It should be appreciated that, in various exemplary embodiments, an auto focus tool according to this invention, in addition to various GUI elements and widgets associated with the tool, includes underlying menus, methods, operations, and settings, that respond to user input and/or automatically determine and provide various operations and/or settings that simplify the definition and performance of various auto focus operations for a user of the machine vision inspection system. Thus, in various exemplary embodiments according to this invention, the portion of the user-defined region of the interest that is actually used to determine the corresponding estimated best focus position is adjusted and/or minimized semi-automatically or automatically by various operations associated with the auto focus tool. For example, in various exemplary embodiments, the portion of the user-defined region of the interest that is actually used for auto focus operations is determined such that it both overlaps with an operable reduced readout pixel set of the camera that enables a high auto focus image acquisition rate and provides a sufficient number of pixels to determine the corresponding estimated best focus position with a desired level of accuracy determined by an operator input or a default accuracy level. Such operations are described in greater detail further below.

In various exemplary embodiments, the control system portion 100 includes respective default values for the size of the region of interest, or portion of the region of interest, that is actually used for auto focus operations corresponding to respective desired levels of accuracy specified by an operator. In various exemplary embodiments, the default values are established empirically, based on experience with a variety of workpieces, or analytically. In various exemplary embodiments, the auto focus operation determining circuit, routine or application 170 then applies the default values when defining operations and settings related to an auto focus region of interest defined by an operator. For example, in various exemplary embodiments, the region of interest indicating portion of a GUI auto focus tool widget is located and nominally sized by an operator and a desired accuracy mode is selected by the operator. Then, in various exemplary embodiments, the auto focus operation determining circuit, routine or application 170 determines the actual operational pixel set within the nominal auto focus region of interest indicated by the operator, based on the selected auto focus accuracy mode and an operational reduced readout pixel set of the camera, as outlined above.

As previously mentioned, in various exemplary embodiments, in addition to providing a full pixel set corresponding to a full field of view, the camera system 260 is operable to select at least one reduced readout pixel set within the camera frame. In various exemplary embodiments, the at least one reduced readout pixel set includes a central band of 100 rows of pixels, a band of rows of pixels that has a selectable variable location and or span, a centrally-located 100×100 range of contiguous (i,j) pixels, a selectable 100× 100 range of contiguous (i,j) pixels that has a variable location, or a fully selectable set of contiguous (i,j) pixels, or the like.

It should be appreciated that, in various exemplary embodiments, when a reduced readout pixel set is selected for operation, the time that it takes to output the reduced readout pixel set from the camera is shorter than the time that it takes to output a full pixel set of the camera. Therefore, the overall repetitive image acquisition rate of the camera system 260 is faster, compared to repetitive image acquisition rate associated with the full field of view of the camera. For example, various exemplary embodiments incorporating the Redlake camera provide an image rate of approximately 125 images per second when the full frame is output from the camera, and an image rate of approximately 350 images per second when a reduced readout pixel set of 100×100 pixels is output from the camera. Furthermore, for various cameras usable according to this invention, other factors being equal, as the size of the reduced readout pixel set is reduced, the overall repetitive image acquisition rate of the camera system 260 increases, as described below with reference to FIG. 13.

The term reduced readout pixel set is used herein to emphasize that, for a variety of cameras usable for the camera system 260, a full field of image is captured or acquired by the camera system 260 "in parallel", and therefore this image capture or acquisition time is not sensitive to the number of pixels values captured. In contrast, typically, the time associated with outputting pixels values from the camera system 260, where pixel values are typically serially output to the control system portion 100, does depend on the number of pixel values output, and is one of the larger time factors that limit the repetitive image acquisition rate that can be provided by the camera system 260. However, it should be appreciated that in various exemplary embodiments, since only the reduced readout pixel set is actually operational in various auto focus operations according to this invention, the camera system 260 optionally, but not necessarily, is operated to restrict other camera operations, such as image capture operations or the like, to the reduced readout pixel set.

In various exemplary embodiments, based on an established size of the reduced readout pixel set (and possibly its position relative to the camera frame), and known camera operating characteristics and the like, the auto focus operation determining circuit, routine or application 170 determines an operational rate of auto focus image acquisition, that is, the operational timing between the acquisition of auto focus images. In various exemplary embodiments, a default maximum free-running repetitive image acquisition rate of the camera, based on the established reduced readout pixel set, is used. In various other exemplary embodiments, the auto focus operation determining circuit, routine or application 170 determines a rate less than the maximum free-running repetitive image acquisition rate, and that determined rate is implemented by the image control interface 140.

In various exemplary embodiments, based on an established operational timing between the acquisition of auto focus images, and a desired auto focus curve sampling density as outlined below with reference to FIGS. 3 and 4, the auto focus operation determining circuit, routine or application 170 determines a desired maximum or practical maximum motion speed along the Z-axis direction, during the acquisition of auto focus images. In various exemplary embodiments, the auto focus operation determining circuit, routine or application 170 then defines any other motion operations and/or settings that are needed to complete the definition of a motion that is used for run mode auto focus operations. Similar to the determination of the portion of the region of interest that is actually used for auto focus operations, in various exemplary embodiments, the desired auto focus curve sampling density is determined corresponding to the desired level of accuracy specified by an operator, as described in greater detail below with reference to FIGS. 3, 4 and 14.

It should be appreciated that, in various exemplary embodiments, the practical maximum Z-axis speed is further limited by the allowable amount of auto focus image blur-ambiguity due to the Z-axis motion during the effective exposure period of an auto focus image. That is, as the focus distance changes during an exposure, it is not possible to determine what focus specific distance contributed most or all of any out-of-focus or blurred characteristics of the acquired image. Thus, in various exemplary embodiments, the camera system 260, or a strobe illumination system, is used to sufficiently limit the effective exposure duration of the auto focus images, such that the focus characteristics of the acquired image correspond to a specific focus distance to a desired level of accuracy.

In various exemplary embodiments, based on an established operational maximum Z-axis speed during the acquisition of auto focus images, and a determined limit for the amount of Z-axis displacement that is allowable during an effective exposure duration of the auto focus images, the effective exposure duration of the auto focus images is also determined by the auto focus operation determining circuit, routine or application 170. In various exemplary embodiments, when this effective exposure duration is within the exposure control capabilities of the camera system 260, an appropriate continuous illumination power level is used during the auto focus image acquisition and the camera system 260 is controlled to provide the determined effective exposure duration.

In various exemplary embodiments, a typical general-purpose precision machine vision inspection system is operated approximately according to the principles of this invention outlined above, with a lens configuration providing a depth of field of approximately 14 microns and a magnification of 2.5 of a typical machined metal workpiece surface, an auto focus region of interest size of 100×100 pixels, an operative imaging rate of approximately 222 auto focus images per second, and continuous illumination, is able to auto focus to provide an estimated best focus position in approximately 1.2 seconds, with a repeatability better than 0.2 microns, or less than approximately 2% of the depth of field of the lens configuration, for repeated auto focus trials using a maximum auto focus image spacing of approximately 5–6% of the depth of field of the lens configuration.

In various exemplary embodiments, when a maximum auto focus image spacing of approximately 100% of the depth of field of the lens configuration is used, allowing fewer auto focus image acquisitions and/or a faster Z-axis scan motion speed, the systems and methods according to this invention are able to auto focus to provide an estimated best focus position in approximately 0.5 seconds, with a repeatability better than 1.7 microns, or less than approximately 15% of the depth of field of the lens configuration, for repeated auto focus trials. Various considerations with respect to auto focus image spacing and the accuracy of an estimated best focus position are described below with reference to FIGS. 3 and 4.

In various exemplary embodiments, when an effective exposure duration is not within the exposure control capabilities of the camera system 260 and a strobe illumination system is included in the machine vision inspection system 10, the lighting system driver/controller 150 and/or the strobe illumination system is/are controlled to provide the determined effective exposure duration and a corresponding strobe illumination power level.

It will be appreciated that, in various exemplary embodiments, a particular effective exposure time generally requires a particular illumination intensity or power level in order to provide a desirable overall intensity level for the acquired auto focus images. Thus, in various exemplary embodiments, during a training mode operation, an operator establishes a desired configuration of the various lights 220, 230, and or 240, using continuous illumination and a default, known or standard effective exposure time provide by the camera, for example.

In various exemplary embodiments, the continuous illumination is adjusted to a desired intensity or power level manually, semi-automatically or automatically, to provide a desirable image characteristic in a workpiece image that is acquired with a default, known or standard camera integration period. It will be appreciated that continuous illumination is more practical and easier for an operator to use for a variety of manual operations performed during a training mode of operation.

In various exemplary embodiments, at least during a run mode of auto focus operation, the desired configuration of lights alternatively operates using a strobe lighting capability, for example, provided as outlined below with reference to FIG. 5. In such various exemplary embodiments, the control system portion 100 includes various calibration factors, conversion factors, look up tables, or the like, that are usable by the auto focus operation determining circuit, routine or application 170 to determine an intensity or power level to be used with the effective exposure duration established for the strobe illumination system. In various exemplary embodiments, this provides the same total image exposure that is provided by the known continuous illumination intensity or power level established in conjunction with the default, known or standard camera integration period used during the training mode of operation, as outline above.

In various exemplary embodiments, a known light source continuous power level times the known or standard camera integration period establishes a total exposure illumination energy for that light source. In various exemplary embodiments, to establish an operational strobe illumination power level for that light source, the total exposure illumination energy is divided by the effective exposure duration established for the strobe illumination system, and the strobe illumination power level for that light source is set accordingly. It should be appreciated that, in various exemplary embodiments, actual control levels for a strobed light source are adjusted for various practical operating characteristics of the light source and/or various associated optical and electronic components. Appropriate adjustments will generally be relatively stable over time, and may therefore be established initially and/or periodically by analysis and/or experiment for a particular type of light source and controller, in various exemplary embodiments.

In various exemplary embodiments, the region of interest focus value determining and comparing circuit, routine or application 175 determines a focus value for at least an operative portion of a region of interest in an auto focus image or other image obtained by the camera system 260 and stored in memory 130. The focus value is indicative of the degree of focus provided in that portion of the image. In various exemplary embodiments, the region of interest focus value determining and comparing circuit, routine or application 175 also compares different focus values determined for the region of interest in multiple images. Thus, in various exemplary embodiments, the region of interest focus value determining and comparing circuit, routine or application 175 also determines the one of the auto focus images that provides the best focus in the region of interest.

Figure 3:
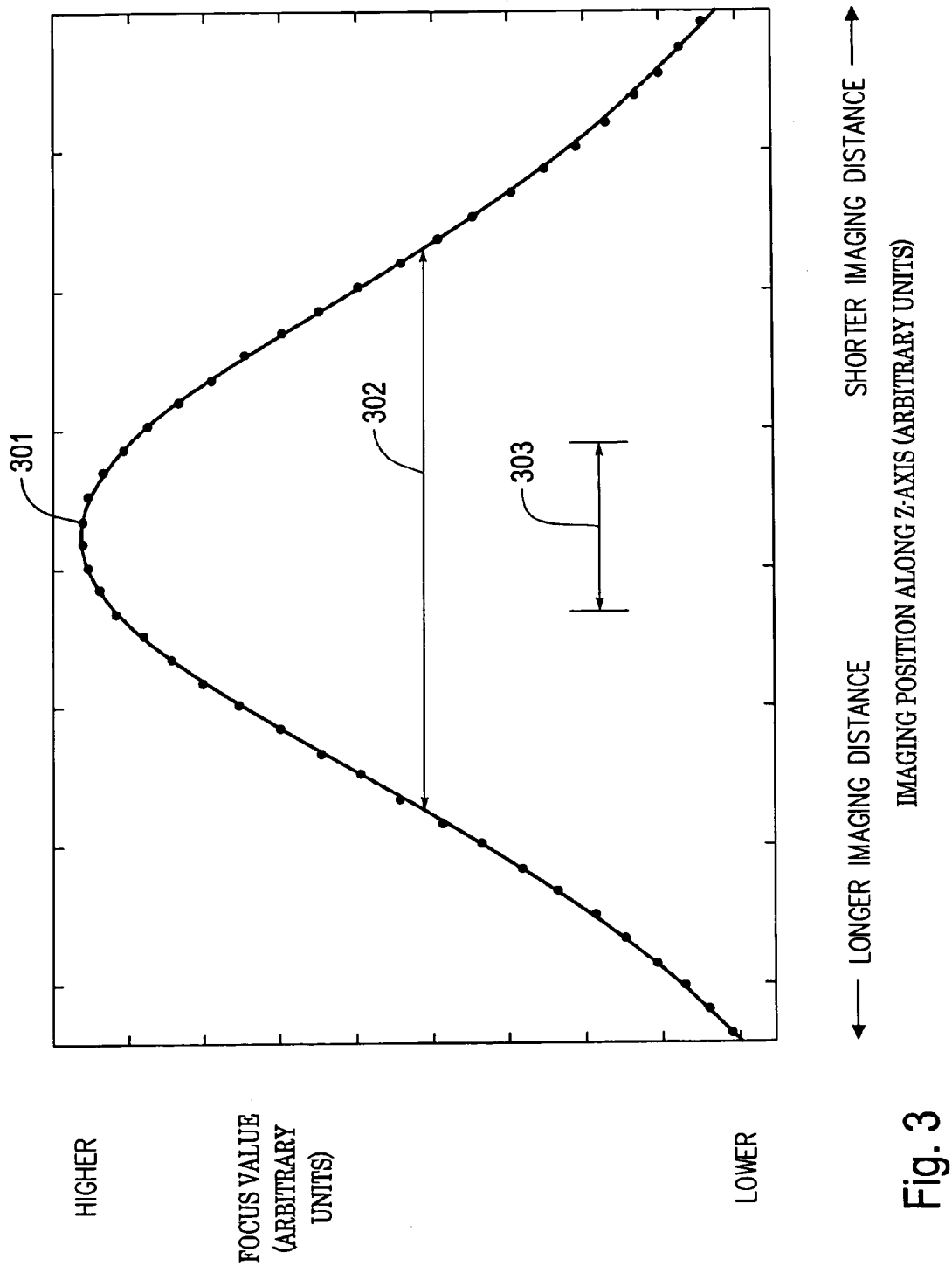
FIG. 3 is a representative graph illustrating a focus curve corresponding to a set of densely sampled focus curve data points.

FIG. 3 is a representative graph illustrating a focus curve corresponding to a set of focus value points 301 that are densely sampled, that is, at a relatively large number of locations along the Z-axis. FIG. 4 is a representative graph illustrating a focus curve corresponding to a set of focus value points 401 that are sparsely sampled, that is, at a relatively small number of locations along the Z-axis. As previously described, and as further described hereinafter in greater detail, various exemplary embodiments of the systems and methods according to the invention enable the implementation of a densely sampled focus curve in connection with a relatively more accurate auto focus operation and the implementation of a sparsely sampled focus curve in connection with a relatively less accurate auto focus operation. In various exemplary embodiments, this is done in order to provide a desirable combination of auto focus speed and accuracy that is adapted to a particular workpiece inspection image or a particular application.

The focus value on the Y-axis of FIG. 3 generally corresponds to the quality of the focus of a feature included in the operational auto focus region of interest of a corresponding auto focus image. A focus value higher on the Y-axis corresponds to a better focus of the feature in the auto focus region of interest. A focus value lower on the Y-axis corresponds to a worse focus of the feature in the auto focus region of interest. The focus curve typically approximates the shape of a bell curve. Thus, the focus values obtained for focusing distances greater than, and for focusing distances less than, the ideal focal length, will be lower than the focus value for the ideal focal length. Thus, the auto focus search for a best focus position corresponds to a search for the true peak of the true bell-shaped focus curve.

It should be appreciated that the auto focus operations described herein provide focus value "sample" data that is used to estimate the true focus curve and the corresponding best focus position to a desired or sufficient level of accuracy. Thus, when a relatively lower level of accuracy is sufficient and/or a relatively faster set of auto focus operations is desired, the focus curve data is more sparsely sampled, that is, the operable spacing along the Z-axis between various auto focus images is larger. In such cases, the estimated best focus position is a relatively more approximate estimate of the true peak of the focus curve. Conversely, when a relatively higher level of accuracy is required, the focus curve data is more densely sampled, that is, the operable spacing along the Z-axis between various auto focus images is smaller. In such cases, the estimated best focus position is a relatively less approximate, or more accurate, estimate of the true peak of the focus curve.

Figure 4:
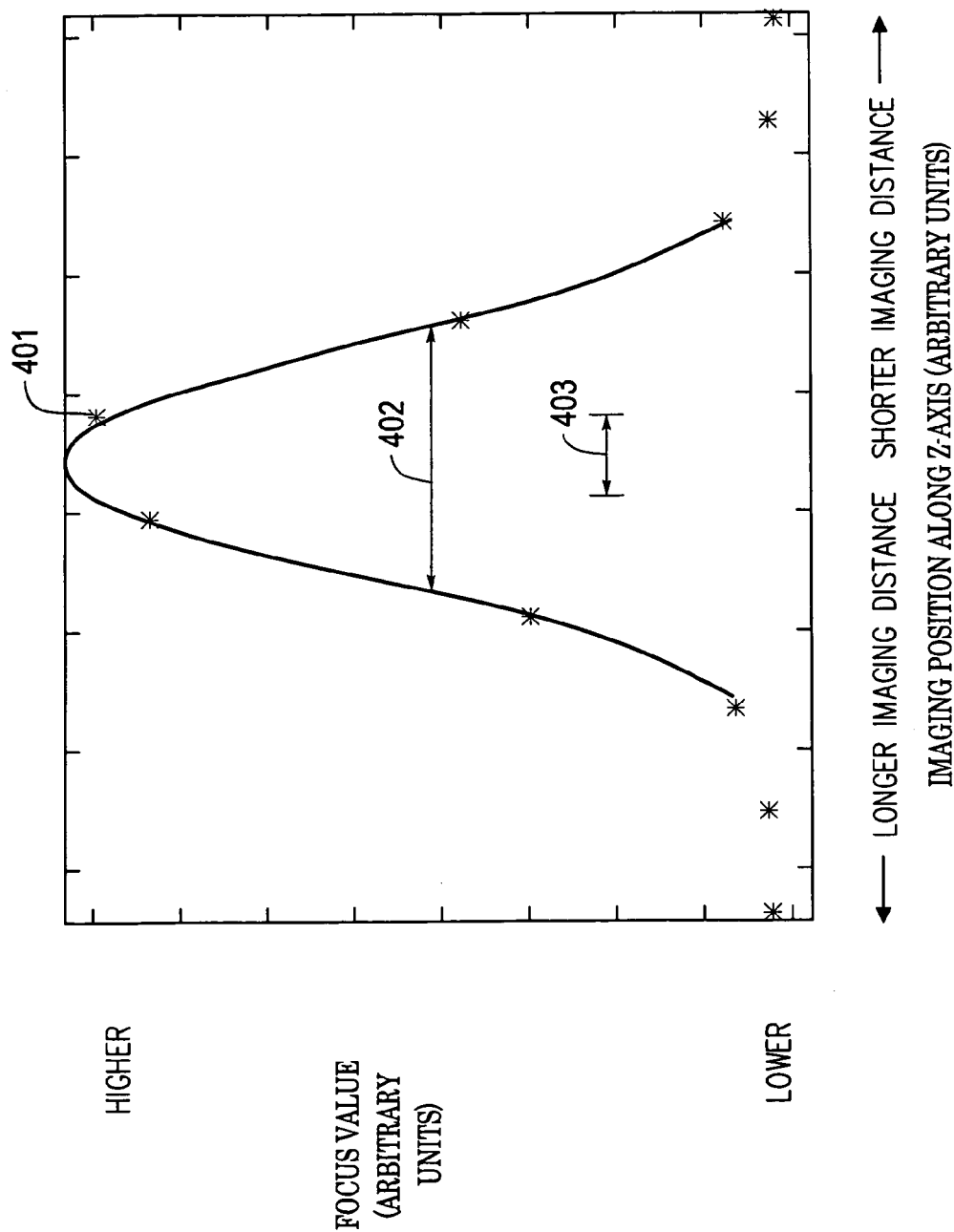
FIG. 4 is a representative graph illustrating a focus curve corresponding to a set of sparsely sampled focus curve data points.

After determining the estimated position of a peak of a focus curve, the corresponding Z-axis position, depicted on the horizontal axis of FIGS. 3 and 4, represents the Z-axis position that is the estimated best focus position that adequately corresponds to a sufficiently focused or best-focused image of the feature in the corresponding region of interest on the workpiece. In general, in various exemplary embodiments, this estimated best focus position provides a coordinate value that is used as an inspection value for the feature in the region of interest and/or as a positioning coordinate that is used to acquire an image of the workpiece that is best used to determine various dimensions and other inspection results for that feature in the region of interest.

A variety of focus value functions, also referred to as focus metrics herein, are usable in various exemplary embodiments according to this invention. In various exemplary embodiments, the feature included in the operational auto focus region of interest is an edge, and a suitable edge focus metric is used, as described in greater detail below with reference to FIG. 8. In various other exemplary embodiments, the feature included in the operational auto focus region of interest is simply the portion of the workpiece surface defined by that region of interest, and a suitable surface focus metric is used, as described in greater detail below with reference to FIG. 8. Surface focus metrics generally provide focus values that correspond to a measurement of contrast in the auto focus region of interest in an auto focus image. One exemplary surface focus metric is described below with reference to Equations 1–3. Various alternative surface focus metrics are also described in detail in the incorporated references, and various suitable focus value functions will also be known to one of ordinary skill in the art. Thus, such functions need not be further described herein.

As previously mentioned, the auto focus operations described herein provide focus value "sample" data that is used to estimate the true focus curve and to estimate the true focus curve peak location corresponding to a best focus position, within a desired or sufficient level of accuracy. As previously mentioned, the true focus curve and the true focus curve peak location is generally estimated with better accuracy and repeatability for a more densely sampled focus curve than for a more sparsely sampled focus curve. It should also be appreciated that, the focus curve sampling density, that is, the operable spacing along the Z-axis between various auto focus images, is determined by the auto focus image acquisition rate of the camera system 260 in combination with the motion speed along the Z-axis during the auto focus image acquisition sequence, in a manner that will be apparent to one of ordinary skill in the art. These factors have been previously discussed with reference to the auto focus operation determining circuit, routine or application 170.

FIG. 3 shows a dimension 302 that represents the full-width-half-maximum dimension, or FWHM, of the focus curve of FIG. 3. FIG. 4 shows an analogous dimension 402 that represents the full-width-half-maximum dimension, or FWHM of the focus curve of FIG. 4. Also shown for purposes of illustration in FIG. 3 is a dimension 303, which represents the depth of field, or DOF, of the lens configuration corresponding to the focus curve of FIG. 3. In various exemplary embodiments, the depth of field is determined according to one conventional expression based on the numerical aperture (NA) of the lens configuration. For the exemplary embodiment shown in FIG. 3, the FWHM 302 of the focus curve is approximately 3.25 times the DOF 303 of the underlying lens configuration. FIG. 4 shows an analogous DOF dimension 403 that represents the DOF of the lens configuration corresponding to the focus curve of FIG. 4. Thus, the DOF of a particular lens configuration, the NA of the lens configuration and the FWHM of the corresponding focus curve are all approximately related in a relatively predictable and approximately constant set of relationships.

Thus, in various exemplary embodiments according to this invention, for a given desired accuracy mode or level, the operable maximum spacing along the Z-axis between various auto focus images, which is related to the minimum focus curve sampling density, is determined based on the desired accuracy mode or level, in combination with a lens characteristic of the operative or current lens configuration. In various exemplary embodiments, the lens characteristic is a direct lens characteristic such as the DOF or NA of a lens, or an indirect lens characteristic, such as a width dimension of the expected resulting focus curve, such as the FWHM, or the like.

In various exemplary embodiments, when the auto focus operations tool is operated in a low accuracy mode, the auto focus operations and/or settings are determined such that the maximum spacing along the Z-axis between various auto focus images is at least 0.2 times the FWHM of the expected nominal focus curve width for a current lens configuration. This allows fast motion during auto focus operations. In various other exemplary embodiments, when the auto focus operations tool is operated in a low accuracy mode, the maximum spacing along the Z-axis between various auto focus images is up to 0.5 times the FWHM. This allows even faster motion during auto focus operations while providing sufficient accuracy for a variety of low accuracy auto focus applications.

In various other exemplary embodiments, similar maximum spacings are determined directly from the NA of a current lens configuration when the auto focus operations tool is operated in a low accuracy mode, the auto focus operations and/or settings are determined such that the maximum spacing in microns along the Z-axis between various auto focus images is at least $0.18/NA^2$ and at most $0.45/NA^2$ for the NA of a current lens configuration. In various exemplary embodiments according to this invention, the settings or parameters outlined above provide an estimated best focus position with an accuracy on the order of 5%–15% of the DOF of the corresponding lens configuration. For relatively high magnification lenses, the accuracy in terms of the DOF tends to be at the larger end of this percentage range, which still provides micron-level accuracy due to the small DOF of such lenses, which may be on the order of a few microns or less for a high magnification lens. Conversely, for relatively low magnification lenses, for example 1–2.5 times magnification or the like, the accuracy in terms of the DOF tends to be at the smaller end of this percentage range, which provides excellent accuracy on the order of a few microns, despite the relatively large DOF of such low magnification lenses, which may be on the order of approximately 10 to 100 microns.

In various exemplary embodiments, when the auto focus operations tool is operated in a higher accuracy mode, the auto focus operations and/or settings are determined such that the maximum spacing along the Z-axis between various auto focus images is at most 0.1 times the FWHM of the expected nominal focus curve width for a current lens configuration. This sacrifices some motion speed and increases the overall auto focus time in order to provide denser focus curve sampling and a significantly better estimate of the best focus position. In various exemplary embodiments, when the auto focus operations tool is operated in a higher accuracy mode, the auto focus operations and/or settings are determined such that the maximum spacing along the Z-axis between various auto focus images is at least 0.02 times the FWHM. This further sacrifices motion speed and further increases the overall auto focus time in order to provide an estimated best focus position accuracy that is approximately the best achievable accuracy for a variety of high accuracy auto focus applications.

In various other exemplary embodiments, when the auto focus operations tool is operated in a higher accuracy mode, the auto focus operations and/or settings are determined such that the maximum spacing in microns along the Z-axis between various auto focus images is at least $0.018/NA^2$ and at most $0.09/NA^2$ for the NA of a current lens configuration. In various exemplary embodiments according to this invention, the settings or parameters outlined above provide an estimated best focus position with an accuracy on the order of 0.5%–5% of the DOF of the corresponding lens configuration. For relatively high magnification lenses, the accuracy in terms of the DOF tends to be at the larger end of this percentage range. This still provides micron or sub-micron levels of accuracy and repeatability due to the small DOF of such lenses, which may be on the order of a few microns or less for a high magnification lens. Conversely, for relatively low magnification lenses, for example 1–2.5 times magnification or the like, the accuracy in terms of the DOF tends to be at the smaller end of this percentage range. This provides excellent accuracy on the order of a few microns or less, despite the relatively large DOF of such low magnification lenses, which may be on the order of approximately 10 to 100 microns.

It should be appreciated that both the particular lens characteristics and the particular values of the maximum spacing along the Z-axis described for the foregoing exemplary embodiments are illustrative only, and not intended to be limiting. Various other lens characteristics and applicable values for the maximum spacing that are appropriate for various machine vision systems, applications, and accuracy levels, should be apparent.

In various exemplary embodiments of the systems and methods according to this invention, a two-pass set of auto focus operations is used to increase the robustness of the auto focus operation for unexpected workpiece variations and the like, while preserving a desirable combination of auto focus speed and accuracy. The first pass is designed to be as fast as possible over a total first pass Z-axis position range, or first pass auto focus image range, also called a focus image range herein, that is certain to include the best focus position, including variations or tolerances for the nominal Z-axis location of the region of interest on the workpiece, as well as any additional variations or tolerances for the nominal Z-axis positioning of the workpiece stage, to the extent that such positioning variations are not eliminated by preliminary operations that establish an adjusted workpiece coordinate system, or the like. In general, in various exemplary embodiments according to this invention, the total first pass auto focus image range is defined such that it is centered about a nominal Z-position that has been determined manually by an operator, or semi-automatically, or automatically based on various lens parameters, workpiece CAD data and the like, to provide an approximately focused region of interest. In various exemplary embodiments, the total first pass auto focus image range is further defined with due consideration to the depth of focus of a current lens, and the previously discussed positional tolerances of the workpiece auto focus region of interest, and the like. In various exemplary embodiments, the total first pass auto focus image range is on the order of 1–4 mm, most of which is attributed to potential workpiece and region of interest position variations, particularly when higher magnification lenses are used, because such lenses typically have a DOF which is on the order of microns and is therefore typically negligible in comparison to the potential workpiece region of interest position variations.

In anticipation of a second pass described below, in various exemplary embodiments, the first pass only needs to support a very approximate estimate of the best focus position. Thus, the focus curve is sparsely sampled during the first pass auto focus operations, for example, approximately corresponding to FIG. 4, or as described for the low accuracy mode above, with due consideration to the depth of field, or other lens characteristic, of the current lens. In various exemplary embodiments, the location of the peak of the focus curve is then estimated to provide an estimated best focus position that is an approximate value usable for refining a second pass focus image range to rapidly determine a refined estimate of the best focus position.

In various exemplary embodiments, the second pass is designed to provide a desired refined or final level of accuracy when determining the estimated best focus position. Thus, during the second pass auto focus operations in these various exemplary embodiments, the focus curve is more densely sampled over a much shorter second pass auto focus image range, for example, in various exemplary embodiments, over a range of 2–5 times the DOF, in the vicinity of the nominal approximately-estimated best focus position that was determined based on the first pass auto focus image data. For example, the second pass sample density approximately corresponds to FIG. 3, or as described for the higher accuracy mode above, with due consideration to the desired accuracy and the depth of field, or other lens characteristic of the current lens, in these various exemplary embodiments. The location of the peak of the focus curve, that is, the best focus position, is then estimated to the desired level of accuracy based on the second pass auto focus image data in various exemplary embodiments.

It should be appreciated that, in various exemplary embodiments, the estimated best focus position determined by auto-focusing is either used to directly determine the height along the Z-axis direction that is used as an inspection dimension for a surface in the region of interest, or to position the camera along the Z-axis to maximize the sharpness of an edge in the image plane prior to edge detection, or the like, or both.

It should be appreciated that, in various exemplary embodiments of the systems and methods according to this invention, a strobe lighting capability is employed to limit the effective exposure duration and any related blur-ambiguity of various auto focus images as previously described with reference to the operations of the auto focus operation determining circuit, routine or application 170. As previously outlined, the X, Y and Z position values associated with a particular auto focus image are, in various exemplary embodiments, based on position encoder signals tracked by the motion control subsystem 145.

In various exemplary embodiments, the relative position between the camera and stage or workpiece that corresponds to the various auto focus images used to estimate the best focus position must be known with high reliability and with high precision. Accordingly, in various exemplary embodiments according to this invention, at least the Z-axis position value is latched in the motion control subsystem 145 with a known relation to the effective time of the exposure of the corresponding image, and stored in relation to that image. Accordingly, in various exemplary embodiments, when continuous motion is used during auto focus image acquisition, it is advantageous to use strobe lighting and to both trigger the strobe lighting and latch the corresponding position values at a specific time in relation to the strobe lighting duration, for example, in relation to the strobe lighting trigger. In various exemplary embodiments, this is all initiated and repeated under control of the control system portion 100 at specific times when the system configuration corresponds to auto focus image locations that provide a desired auto focus image spacing along a desired auto focus image range.

In various other exemplary embodiments, this is all initiated by the control system portion 100 when the Z-axis position is at one end of the operative focus image range, and repeated throughout the focus image range according to a maximum free-running rate or repetitive timing determined by the imaging control interface 140 and/or the camera system 260, so as to provide a corresponding set of auto focus images that are within a desired maximum focus image spacing throughout the operative focus image range. In various exemplary embodiments, the set of auto focus images are terminated based on a determined number of image repetitions, or a detected position at or beyond the end of the focus image range. Various considerations related to typical vision system components regarding high speed imaging, imaging moving objects, synchronization issues, and the like, are discussed in detail in "High Speed, Real-Time Machine Vision", by Perry C. West, Automated Vision Systems Inc., www.autovis.com, 2001, commissioned by CyberOptics-Imagenation, www.imagenation.com, which is hereby incorporated by reference in its entirety.

Figure 5:
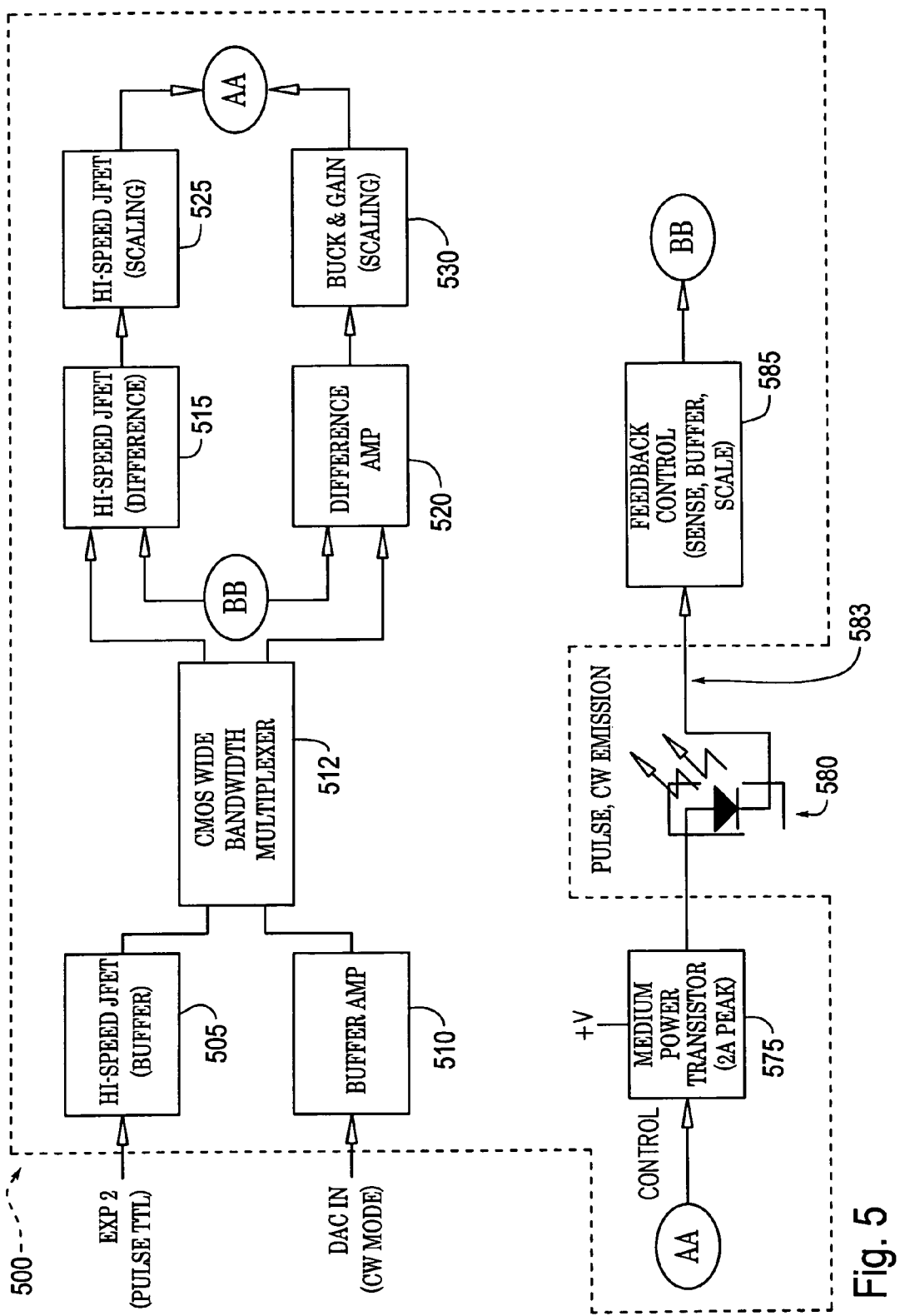
FIG. 5 is a schematic diagram showing one exemplary embodiment of a strobe light control system according to this invention.

FIG. 5 is a schematic diagram showing one exemplary embodiment a strobe light control system according to this invention. In various exemplary embodiments, the strobe light control system 500 includes a continuous illumination control capability. In various exemplary embodiments, the strobe light control system 500 is included in the lighting system driver/controller 150. In various exemplary embodiments, the light control system 500 is implemented using generally known conventional circuit elements and conventional circuit design techniques. In various exemplary embodiments, the components of the light control system 500 are selected to provide a high-speed, feedback-controlled current driver capable of operating a current source for a light source such as an LED, or diode laser, or the like, at rates as high as 5 MHz and higher. In various exemplary embodiments, the components are selected to provide an induced phase delay that is approximately 1 microsecond or less; that is, the strobe pulse is initiated within approximately 1 microsecond after receiving the leading edge of the input control signal EXP 2. In various exemplary embodiments, the components are selected to provide peak currents as high as approximately 1.5 A for a strobe mode strobe duration as short as 500 nsec and as long as 40 msec.

Thus, as shown in FIG. 5, in various exemplary embodiments the light control system 500 includes a light source 580 such as any of the lighting devices 220, 230 or 240, that is capable of providing high intensity strobed illumination. In various exemplary embodiments, the light source 580 includes an LED, as previously discussed. A fast-response medium power transistor 575, capable of providing, for example, approximately 1.5 A (2 A peak), is connected to drive the light source 580 according to a control signal AA. The light source 580 provides a feedback control signal 583 that corresponds to the output power of the light source 580. In various exemplary embodiments, the feedback control signal 583 may be generated from a portion of the light from the light source 580. The feedback control signal 583 is provided to a buffer circuit portion 585 that, in various exemplary embodiments, senses, and/or amplifies or scales the feedback control signal 583 to provide the feedback control signal BB.

In various exemplary embodiments, the light control system 500 is operated in two separate modes. In a strobe mode, a control signal EXP 2 is input to a high speed input buffer 505. The signal EXP 2 is generated by and output from a framegrabber included in the imaging control interface 140, as described below. A multiplexer 512 is controlled by one or more mode select signals from the controller 120, imaging control interface 140, or other component of the control system portion 100, over one or more signal lines to route the control signal EXP 2 to a high speed difference amplifier 515. The difference amplifier 515 also receives the feedback control signal BB from the buffer circuit portion 585. A difference signal is output by the difference amplifier 515 to a high speed amplifier 525 that amplifies or scales the difference signal to provide the control signal AA that is input to the medium power transistor 575 to drive the light source 580 in a strobe mode.

In a continuous illumination mode, a "DAC IN" control signal is input to an input buffer 510. The DAC IN signal is generated by and output from the controller 120 in various exemplary embodiments. The multiplexer 512, controlled by the one or more mode select signals from the controller 120 routes the DAC IN control signal to a difference amplifier 520. The difference amplifier 520 also receives the feedback control signal BB from the buffer circuit portion 585.

A difference signal is output by the difference amplifier 520 to an amplifier 530 that amplifies or scales the difference signal to provide the control signal AA that is input to the medium power transistor 575 to drive the light source 580 in a continuous illumination mode. In the continuous illumination mode, the control signal AA is controlled below a maximum level that controls the current in the medium power transistor 575 and light source 580 at a level that provides a long operating life for those components.

By having two such separate operating modes, the strobe light control system 500 can be used to retrofit legacy vision inspection machines 10, and can be used in other applications where it is desirable to operate a precision machine vision inspection system using systems and methods according to this invention both with and without strobe lighting, as well as conventional systems and methods that use relatively continuous illumination that is typically controlled by a signal such as the DAC IN signal. It should be appreciated that, by having two such separate operating modes, the strobe light control system 500 is particularly useful for providing continuous illumination during various manual operator-directed training mode operations and providing a strobe illumination that provides a total exposure illumination energy similar to that provided during the various training mode operations during various automatic run mode operations used in various exemplary embodiments of systems and methods according to this invention.

In order to both trigger the strobe lighting and to latch the corresponding position values at a specific time in relation to the strobe lighting duration, these system elements described above are operably interconnected in the control system portion 100. Operational steps associated with the strobe mode of operation are described below in connection with the run-time operational method of the invention.

Figure 6:
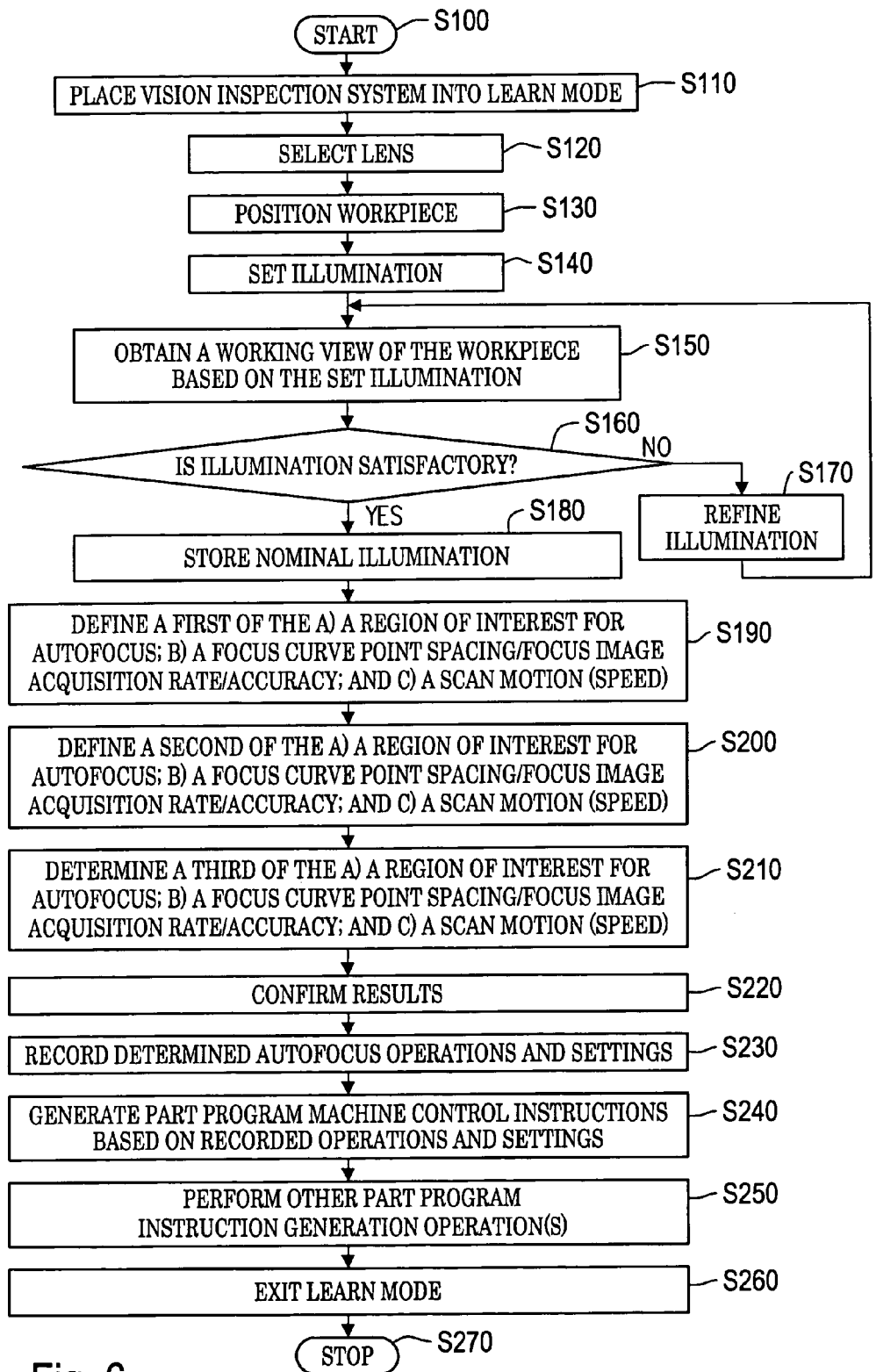
FIG. 6 is a flowchart outlining one exemplary embodiment of a method for determining parameters for automatically focusing on a region of interest of a workpiece according to this invention.

FIG. 6 is a flowchart outlining one exemplary embodiment of a learn mode of training mode method for determining operations and settings for automatically focusing on a region of interest of a workpiece according to this invention in run mode. The method starts at step S100 and continues to step S110, where the vision inspection system is placed into a learn mode. Then, in step S120, a current lens for the camera is selected. Next, in step S130, the workpiece to be evaluated is positioned at a desired location so that the portion of the workpiece to be inspected is in the field of view of the camera. Operation then continues to step S140.

In step S140, the illumination on the workpiece is set. It should be appreciated that the illumination can be set by the user or can be set semi-automatically or automatically. In various exemplary embodiments, a continuous illumination is set. Next, in step S150, a working view of the workpiece is obtained based on the set illumination. In various exemplary embodiments, the portion of the workpiece visible in the working view is a function of the position at which the workpiece has been placed.

In various exemplary embodiments, the working view of the workpiece that is obtained based on the set illumination includes a working view image acquired using a strobe lighting duration short enough to provide an acceptable auto focus image when used in combination with any practical Z-axis speed during an auto focus image acquisition sequence. In various exemplary embodiments in which a continuous illumination is set in step S140, strobe illumination parameters are derived from the continuous illumination settings.

Then, in step S160, the working view obtained from the camera is evaluated to determine whether or not the illumination is satisfactory. If the illumination is not satisfactory, operation continues to step S170. Otherwise, operation jumps to step S180.

In step S170, the illumination settings are refined, for example, based on the operator modifying various illumination settings. Operation then returns to step S150. In contrast, in step S180, the current illumination settings are stored. Operation then continues to step S190. In step S170, if the unsatisfactory illumination is too faint, then the illumination is increased in intensity. In contrast, if the unsatisfactory illumination is too bright, then the illumination is decreased in intensity.

In various exemplary embodiments, the systems and methods according to this invention determine three compatible and/or interrelated auto focus characteristics or variables, and/or their associated control parameters or settings, that control how rapidly an automatic focusing operation according to this invention can be performed. In various exemplary embodiments, these characteristics are the size of an auto focus region of interest for the auto focus operation, the rate at which the auto focus images are acquired, and the maximum speed at which the camera scans along the Z-axis while acquiring auto focus images.

It should be appreciated that, in various exemplary embodiments, in order to establish a desirable combination of high speed and high accuracy auto focus according to this invention, these three variables or characteristics are determined in an interrelated manner. In various exemplary embodiments, this is done in order to determine a desirable combination of auto focus image acquisition operations and/or settings corresponding to a desirable combination of auto focus speed and accuracy for determining an estimated best focus position in approximately the shortest practical time that can provide the desired precision for estimated best focus position. In various exemplary embodiments, there are various tradeoffs and relationships between these three variables, as well as alternative exemplary methods and sequences of determining their values. However, more generally, in various exemplary embodiments, the auto focus parameter or variable that is most severely constrained by particular hardware limitations, or accuracy requirements, or the like, for a particular machine vision inspection system or a particular set of auto focus operations, is established first, and the other auto focus parameters or variables that are less constrained by such limitations and requirements are subsequently determined.

Accordingly, in step S190, the value for a first one of these three variables is defined. Then, in step S200, the value for a second one of these three variables is defined in view of the value of the first one of the variables. Next, in step S210, the value for the third one of the three variables is determined based on the defined values for the first two variables. Operation then continues to step S220.

In step S220, the results provided by the set of auto focus characteristics or variables are confirmed by checking an auto focus result. In various exemplary embodiments, this confirmation is provided by an auto focus demonstration that mimics the results of comparable run mode operations. That is, a set of demonstration auto focus operations is run that is substantially similar to run mode operations determined based on the various learn mode operations and the associated machine configuration and set of auto focus characteristics or variables determined during the learn mode operations. For example, a motion, strobe illumination, and image acquisition rate, are used that are similar or identical to those provided by run mode operations and settings, and based on the resulting auto focus images distributed of over a suitable total Z-axis auto focus image range, an estimated best focus position is determined. In various exemplary embodiments, the machine is then positioned at the estimated best focus position, an evaluation image is acquired and displayed, and the evaluation image is evaluated. In various exemplary embodiments, this is done either by manually checking the evaluation image or by performing an inspection operation on the evaluation image and analyzing the results. In various exemplary embodiments, the auto focus demonstration is initiated by the operator using a corresponding GUI control feature.

Then, in step S230, the confirmed set of auto focus operations and settings are recorded. Next, in step S240, the part program machine control instructions corresponding to the confirmed set of auto focus operations and settings and the any other settings used to generate the confirmed auto focus results are generated. In various exemplary embodiments, this data includes information regarding the dimensions of the region of interest, the specifications of a reduced readout pixel set, an image acquisition repetition rate, the illumination settings, which may or may not include, in various embodiments, strobe intensity and strobe duration time, Z-axis scan speed, the nominal parameters of the total Z-axis auto focus image range, the selected current lens, and the like. It should be appreciated that, in various exemplary embodiments, the operations of the steps S230 and S240 may merged and/or indistinguishable. Then, in step S250, other desired part program instructions, if any, are generated. Next, in step S260, the learn mode is exited and the generated part program machine control instructions are stored for future use such as, for example, during an automatic run mode.

As previously described, when positioning the workpiece in step S130, coordinates in an X-axis and a Y-axis are established for the workpiece. Further, the working view obtained in step S150 may be obtained manually by a user or automatically by the machine vision inspection system.

Figure 7:
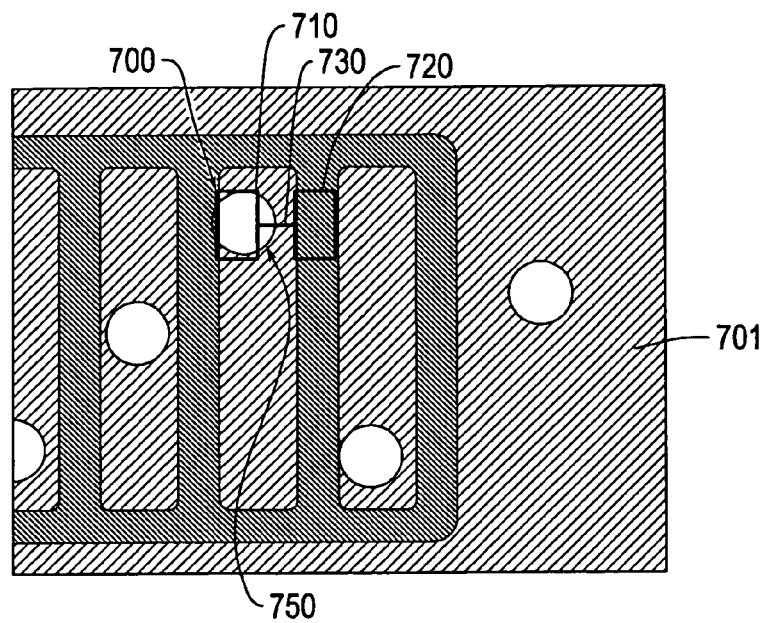
FIG. 7 shows an exemplary workpiece and feature to be inspected, along with an exemplary multi area image quality tool usable to determine a desirable auto focus illumination in various embodiments of the systems and methods according to this invention.

It should be appreciated that, in various exemplary embodiments, setting the illumination in step S140 includes directly setting strobe image parameters. In various exemplary embodiments, when strobe lighting is used to set the illumination, the strobe lighting is controlled or established manually by a user or is controlled or established automatically. The dual area contrast tool described below in connection with FIG. 7 is an example of an automatic exposure evaluation tool that is used to help establish desirable settings for either strobe or continuous illumination in various exemplary embodiments.

When defining the region of interest for the auto focus operation in steps S190 or S200, in various exemplary embodiments, the region of interest for the auto focus operation is defined using a graphical user interface, or by direct editing through, for example, a user interface window. In yet other exemplary embodiments, the region of interest for the auto focus operation is defined by a combination of direct editing and using the graphic user interface.

It should be appreciated that in various exemplary embodiments according to this invention, a reduced readout pixel set, outlined previously, is defined in conjunction with defining the region of interest. In various exemplary embodiments, the reduced readout pixel set is defined automatically by the control system portion 100 based on the region of interest defined in the learn mode operations. In various exemplary embodiments, a GUI used during the various learn mode operations displays certain location and/or size characteristics of an operable reduced readout pixel to provide an operator with visual feedback that is useful for defining the region of interest and/or a corresponding reduced readout pixel set during various learn mode operations. Various considerations regarding the relationship between a region of interest and a corresponding reduced readout pixel set in various exemplary embodiments are discussed below with reference to FIGS. 8–11 and 13.

When defining the focus curve sample density and/or auto focus image spacing in one of steps S190–S210, in various exemplary embodiments the density and/or spacing is selected or determined within a continuous range of values. Alternatively, in various exemplary embodiments predefined respective default values for the density and/or spacing are determined as discrete values associated with operator determined settings such as coarse versus fine, accurate versus less accurate, or/and faster versus slower.

In yet other exemplary embodiments, the focus image acquisition rate is defined, or determined to be, one of an optimizing mode or a simplified mode. In an optimizing mode, for a given camera, a given amount of control over the reduced readout pixel set is provided. In general, at least one dimension of the reduced readout pixel set determined in conjunction with the region of interest will be used to determine the auto focus image acquisition rate, that is, the image acquisition rate that the camera is able to achieve for the reduced readout pixel set associated with the desired region of interest. In a simplified mode, typical sets of values for the three parameters are predetermined for each selectable lens that is used, and that constitutes low, medium and high accuracy for the estimated best focus position, in various exemplary embodiments.

In still other exemplary embodiments, an auto focus tool is run in a default mode that automatically sizes the graphical user interface region of interest indicating widget of the auto focus tool to correspond to an assumed typical reduced readout pixel set having a known associated image acquisition rate for the camera. In various exemplary embodiments, the user positions the region of interest indicating widget and controls one dimension of the region of interest independently, while the other dimension of the region of interest is automatically functionally dependent on the characteristics of the assumed typical reduced readout pixel set.

In other exemplary embodiments, an overrule mode is included for cases when it is determined that the constraints on the region of interest indicating widget of the auto focus tool or the available reduced readout pixel set configuration(s) are unacceptable for a particular feature of the workpiece to be inspected. For example, such an overrule mode may be desirable for workpieces having a surface to be focused on with an odd shape, such as a long narrow shape or the like. In the overrule mode, in some exemplary embodiments, the region of interest is defined anywhere in the full field of view of the camera, a reduced readout pixel set is not used, and relatively slow auto focus operations results, as needed.

In some exemplary embodiments, when defining the scan motion and/or maximum speed at which the camera scans along the Z-axis while acquiring auto focus images in steps S190–S210, the scan motion and/or maximum speed is rounded off into, or selected from, discrete predetermined speed choices. In various other exemplary embodiments, the scan motion and/or maximum speed is determined within a continuous range of speeds available for the machine vision system. In various other exemplary embodiments, the scan motion includes a default or specified acceleration provided by the machine vision system, and the acceleration is terminated at or below the maximum speed that is usable in conjunction with the maximum auto focus image spacing and/or the maximum speed is determined within a continuous range of speeds available for the machine vision system.

It should be appreciated that the method outlined in FIG. 6 is usable to determine or define part program instructions that are operable to automatically focus an image capture device during high-speed automatic machine vision inspection of a workpiece. Once the training or learn mode is completed, and the resulting part program stored, in various exemplary embodiments, multiple additional corresponding workpieces are automatically inspected by retrieving and using the generated and stored part program in a run mode of operation.

FIG. 7 shows one exemplary embodiment of a workpiece image 701 and one exemplary embodiment of a multi area image quality tool 700 useable, in various exemplary embodiments, to semi-automatically or automatically determine a desirable continuous and/or strobe light setting to be used with the rapid auto focus systems and methods that determine an estimated best focus position according to this invention. Various methods and graphical user interfaces usable for the multi area image quality tool 700 and associated lighting adjusting systems, are disclosed in U.S. Pat. Nos. 6,542,180 and 6,239,554, each incorporated herein by reference in its entirety.

The exemplary embodiment of the multi area image quality tool 700 shown in FIG. 7 is a dual area image quality tool. The exemplary dual area image quality tool 700 includes a first region of interest 710 and a second region of interest 720 connected by a bar 730. The region occupied by the bar 730 constitutes a critical region that generally includes a workpiece feature that is to be inspected. As taught in the '180 patent, the dual area image quality tool 700 is used to establish a lighting configuration and lighting level that maximizes the difference between the average image intensities measured in the first region of interest 710 and the second region of interest 720. In this manner, in various exemplary embodiments, the transition of intensity over an edge 750 or other feature in the critical region will lead to the most precise definition of the edge 750 or other feature in the image 701, for a given degree of focus in the critical region. The regions of interest 710 and 720 are defined as rectangles. It should be appreciated that any number of regions of interest having any desired shape are provided within the multi area image quality tool 700, in various exemplary embodiments, as taught in the '180 patent.

It should also be appreciated that, in other various exemplary embodiments of the multi area image quality tool, different ratios for the width of the regions of interest and the linking bar or bars can be used. It should be appreciated that the length of the linking bar can be zero. That is, two regions of interest can be placed immediately adjacent to each other and right to the edge of a feature to be inspected in the critical region, such as an edge.

A multi area image quality tool 700, or the like, is included to operate in a variety of ways in various exemplary embodiments of the systems and methods according to this invention. For example, in various exemplary embodiments, a multi area image quality tool is employed by an operator during a training mode, in order to evaluate and/or refine an illumination configuration and level originally approximately defined by the operator. In various exemplary embodiments, the illumination configuration and level originally approximately defined by the operator are either a continuous or strobe lighting configuration and level. In various exemplary embodiments, this is refined using the multi area image quality tool. In other various exemplary embodiments, the illumination configuration and level originally approximately defined by the operator is a continuous lighting configuration converted to strobe lighting configuration that provides an approximately equivalent total image exposure, and the strobe lighting configuration is refined using the multi area image quality tool.

In various other exemplary embodiments, a multi area image quality tool is included in the part program and is executed to refine various nominal continuous or strobe lighting levels used in conjunction with various auto focus operations. For example, in various exemplary embodiments, when the auto focus region of interest includes an edge to be inspected, the multi area image quality tool is run following an initial auto focus sequence, and/or prior to acquiring the final inspection image at the estimated best focus position. In various exemplary embodiments, this is done in order to compensate for the effects of lighting system calibration "drift", environmental lighting changes, or the like, and provides the best practical edge auto focus definition and/or accuracy when automatically inspecting a workpiece in run mode.

Figure 8:
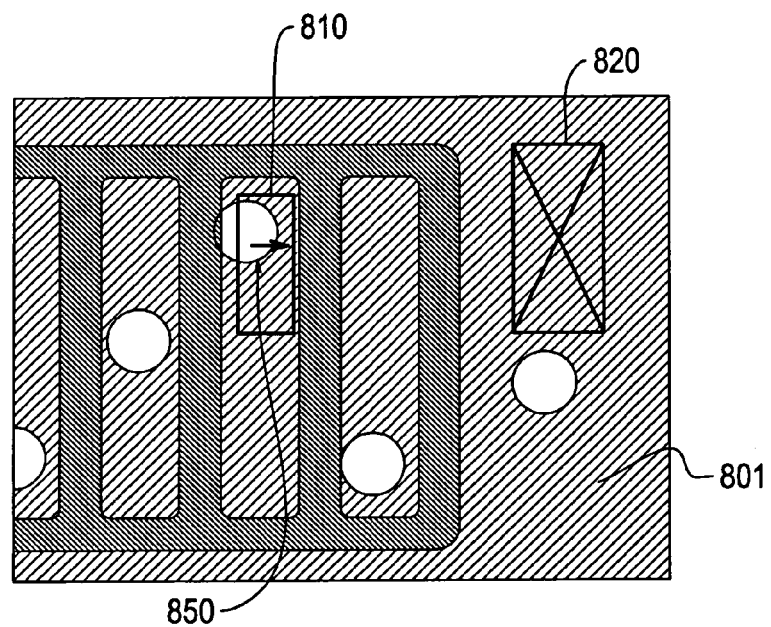
FIG. 8 shows the exemplary workpiece and feature to be inspected of FIG. 7, along with two exemplary embodiments of graphical user interface auto focus tool widgets usable in various embodiments of the systems and methods according to this invention.

FIG. 8 shows the exemplary workpiece and feature to be inspected of FIG. 7, along with two exemplary embodiments of auto focus tool GUI widgets usable in various embodiments of the systems and methods according to this invention. Two exemplary embodiments of auto focus tool GUI widgets usable with the systems and methods according to this invention include an edge focus tool widget 810 and a surface focus tool widget 820. In various exemplary embodiments, these auto focus tools are used to automatically focus on the exemplary workpiece image 801. In various exemplary embodiments, predefined auto focus tools have specific settings. In various exemplary embodiments, these settings are adjusted or redefined by a user, but need not be redefined in order to use the tool. In various exemplary embodiments, the tools are employed with the predefined settings. Various operating characteristics of the edge focus tool GUI widget 810 and the surface focus tool GUI widget 820 are generally described in the QVPAK 3D CNC Vision Measuring Machine Users Guide and the QVPAK 3D CNC Vision Measuring Machine Operation Guide, previously incorporated.

In various exemplary embodiments, the edge focus tool widget 810 is displayed as a box with an arrow in the center. In various exemplary embodiments, the widget 810 is sized, positioned and rotated by an operator, until the box is indicative of, or defines, the auto focus region of interest and the arrow is indicative of an edge to be inspected, that is also the edge having the characteristics that are evaluated by the operative edge focus metric(s).

In various exemplary embodiments, the edge focus metric uses one or more conventional edge gradient(s) along the edge in the region of interest, and the focus value used for each auto focus image is the signed magnitude of the edge gradient(s). The direction of the arrow, in effect, defines a reference direction or polarity to be associated with the edge gradient in these various exemplary embodiments. It should be appreciated that the region of interest indicated by the boundaries of the edge focus tool widget 810 is reduced in size, to include just a short segment along an edge, in various exemplary embodiments, when desired.

In various exemplary embodiments, the surface focus tool GUI widget 820 is displayed as a box with an "X" in the center. In various exemplary embodiments, the surface focus tool widget 820 is sized, positioned and rotated by an operator, until the box is indicative of, or defines, the auto focus region of interest. It should be appreciated that the region of interest of the surface focus tool widget 820 is increased or reduced in size, to include approximately the proper surface portion used for a particular inspection operation, such as a height determination, or a surface finish evaluation, or the like, in various exemplary embodiments.

As previously mentioned, in various exemplary embodiments according to this invention, the camera system 260 is operated to provide a reduced readout pixel set according to this invention. The reduced readout pixel set corresponds to substantially less than the full field of view of the camera system 260 along at least one dimension of the field of view of the camera system 260. Thus, a repetition rate for acquiring a sequence of auto focus images and storing the data corresponding to the reduced readout pixel set is substantially faster than the rate associated with acquiring images and storing the data corresponding to a full pixel set for the entire field of view of the camera system 260. In various exemplary embodiments, a camera system 260 is used that is operable to provide a reduced readout pixel set that substantially or identically corresponds to the regions of interest defined using the edge focus tool widget 810 or the surface focus tool widget 820. In these exemplary embodiments, the pixels corresponding to the entire region of interest are used to determine a focus value as outlined previously and discussed further below.

In various exemplary embodiments, a surface focus operation provides an image focus that maximizes the definition or sharpness of a surface texture in a region of interest, or a pattern projected onto a smooth surface in a region of interest, in order to provide a coordinate value that precisely locates that surface along the Z-axis direction, or to provide an inspection image at the coordinate that provides the clearest image for inspecting the surface. In various exemplary embodiments, the surface focus metric used to determine the focus value for an auto focus image is indicative of the degree of contrast in the region of interest. One embodiment of such a surface focus metric is the squared gradient of pixel image intensity or grey-level in the region of interest. When focusing onto a surface, in various exemplary embodiments, the contrast determination is based on the average squared gradient of the image intensity or grey-level within the region of interest. For example, the following equations demonstrate one exemplary embodiment of calculating a focus value in such exemplary embodiments. For a point i at the interstice of four pixels A, B, C, and D, define:

$$\text{Contrast}_i = (A_i - B_i)^2 + (A_i - C_i)^2 + (D_i - B_i)^2 + (D_i - C_i)^2 \tag{1}$$

which can be rewritten as:

$$\text{Contrast}_i = 2[A_i^2 + B_i^2 + C_i^2 + D_i^2 - (A_i + D_i)(B_i + C_i)]. \tag{2}$$

For the overall auto focus region of interest (AROI), in various exemplary embodiments, a representative focus value is determined as the average contrast for all N such points in the AROI, that is:

$$\text{focus value}_{AROI} = (1/N) \sum_{i=1}^{N} \text{Contrast}_i. \tag{3}$$

Figure 9:
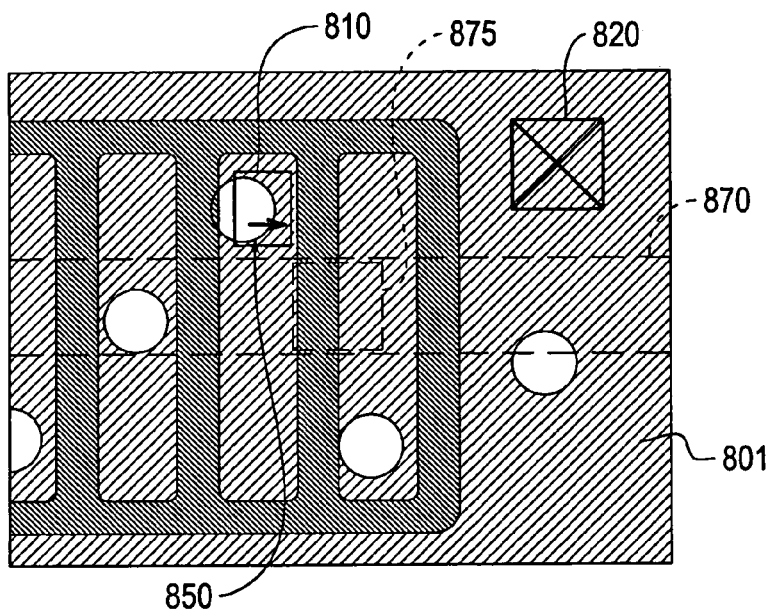
FIGS. 9 and 10 show the exemplary workpiece and feature to be inspected of FIG. 7, along with exemplary embodiments of graphical user interface auto focus tool widgets and exemplary embodiments of reduced readout pixel set indicating widgets usable in various embodiments of the systems and methods according to this invention.
Figure 10:
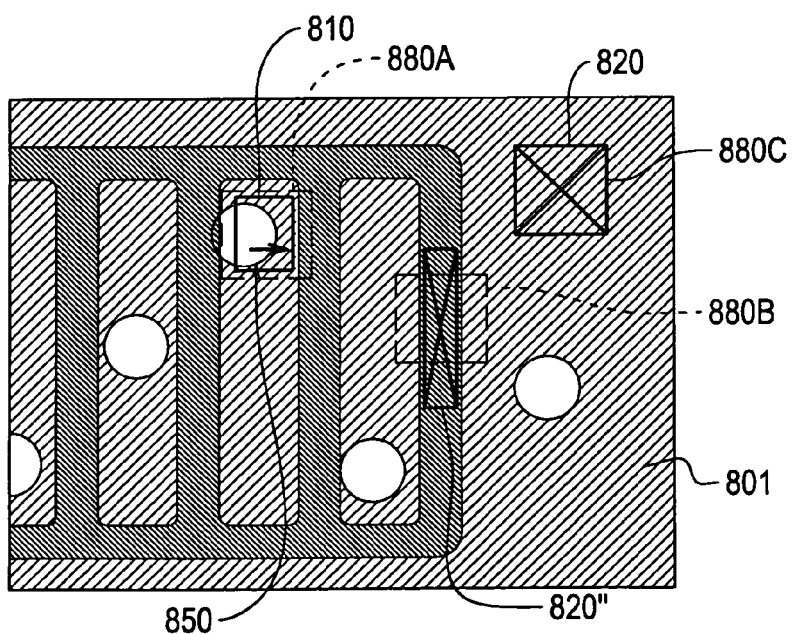

FIGS. 9 and 10 show the exemplary workpiece and feature to be inspected of FIG. 7, along with alternative exemplary embodiments of the graphical user interface auto focus tool widgets 810' and 820' corresponding to the edge focus tool and the surface focus tool, respectively. FIG. 9 also shows two alternative embodiments of reduced readout pixel set indicating widgets 870 and 875. The reduced readout pixel set indicating widget 870 corresponds to reduced readout pixel set of 100 rows of pixels located at a fixed position in the center of the field of view. The reduced readout pixel set indicating widget 875 corresponds to reduced readout pixel set of a 100×100 block of pixels located at a fixed position in the center of the field of view. These alternative exemplary reduced readout pixel sets are provided by various commercially available cameras.

Accordingly, when these exemplary cameras and reduced readout pixel sets are used, in various exemplary embodiments according to this invention, the auto focus tool widgets 810' and 820' corresponding to the edge focus tool and the surface focus tool, respectively, include at least one dimension that is limited or fixed at a size that is equal to, or smaller than, the corresponding fixed dimension of the operable reduced readout pixel set. This is done in order to provide cues or constraints that are helpful to an operator for constructively locating and sizing the region of interest defining widget in the vicinity of a feature of the workpiece to be inspected. For example, in various exemplary embodiments according to this invention, the vertical dimension is so limited or fixed when the reduced readout pixel set corresponding to the indicating widget 870 is operable, and the both the vertical and horizontal dimensions are so limited or fixed when the reduced readout pixel set corresponding to the indicating widget 875 is operable.

In various exemplary embodiments, because only the portion of the region of interest that overlaps with the reduced readout pixel set is actually available and used for determining a corresponding focus value, in order to provide sufficiently accurate and/or repeatable focus values, it should be appreciated that it may be preferable that the operable reduced readout pixel set overlap with a sufficient portion of the region of interest. In various exemplary embodiments, particularly when the region of interest is relatively small, for example, approximately as shown in FIGS. 9 and 10, preferably, but not necessarily, a majority of the region of interest overlaps with the operable reduced readout pixel set. Thus, in various exemplary embodiments that use a reduce readout pixel set having a fixed location, an appropriate reduced readout pixel set indicating widget, such as that indicated by the widgets 870, or 875, or the like, is displayed when an auto focus tool region of interest indicating widget, such as the widget 810', or 820', or the like is displayed, to provide useful visual cues or feedback to an operator during various training mode operations. In such embodiments, an operator may easily position a feature or region of interest to at least partially overlap with the indicated region of the reduced readout pixel set.

In various other exemplary embodiments, the user positions the region of interest outside the indicated region of the reduced readout pixel set, and machine vision system is operable to automatically or semi-automatically reposition the workpiece stage and/or camera such that the region of interest is moved to at least partially overlap with the region of the reduced readout pixel set. In such embodiments, the reduced readout pixel set indicating widget 870, or 875, or the like is useful to provide visual confirmation of the amount of overlap provided.

FIG. 10 shows, in addition to the auto focus tool region of interest widgets 810' and 820', three alternative instances of a reduced readout pixel set indicating widget, the various instances indicated at the positions 880A, 880B and 880C. The reduced readout pixel set indicating widgets 880A, 880B and 880C correspond to a reduced readout pixel set of a fixed or default 100×100 block of pixels located at a controllable variable position in the field of view. Accordingly, when such a reduced readout pixel set is used, in various exemplary embodiments according to this invention, the auto focus tool widgets 810' and 820' are initially presented on the display with a size that is equal to or smaller than the corresponding fixed or default size of the operable reduced readout pixel set. This is done in order to provide cues or constraints that are helpful to an operator for constructively locating and sizing the region of interest defining widget in the vicinity of a feature of the workpiece to be inspected.

As previously described, because only the portion of the region of interest that overlaps with the reduced readout pixel set is actually available and used for determining a corresponding focus value, in order to provide sufficiently accurate and/or repeatable focus values, it should be appreciated that it may be preferable that the operable reduced readout pixel set overlap with a sufficient portion of the region of interest. In various exemplary embodiments, particularly when the region of interest is relatively small, for example, approximately as shown in FIG. 10, preferably, but not necessarily, a majority of the region of interest preferably overlaps with the operable reduced readout pixel set. Thus, in various exemplary embodiments that use a reduce readout pixel set having a fixed size and a variable location, an appropriate reduced readout pixel set indicating widget, such as that indicated by the widgets 880A, 880B and 880C or the like, is displayed when an auto focus tool region of interest indicating widget, such as the widgets 810', or 820', or the like, is displayed. This provides useful visual cues or feedback to an operator during various training mode operations.

In various exemplary embodiments, the reduced readout pixel set and the appropriate indicating widget, such as the widget 880, are automatically centered with respect to the defined region of interest, and when a boundary of the region of interest indicating portion of an auto focus tool GUI widget extends outside of the indicated location of the reduced readout pixel set, a graphical user interface element is automatically activated to highlight that condition. For example, in various exemplary embodiments, the portions of the auto focus tool widget 820" that extend outside of the indicated region of the reduced readout pixel set at the location 880B are highlighted by a line color or thickness change, or the corresponding area highlighted, or the like. In such exemplary embodiments, an operator easily recognizes and or adjusts the portion of a region of interest that does not overlap the indicated region of the reduced readout pixel set, and/or decides whether the overlapping portion is sufficient. If the operator decides that the overlapping area is not sufficient, then the previously outlined overrule mode is implemented in various exemplary embodiments.

At the location 880A, the region of interest 810' is entirely overlapped by the indicated reduced readout pixel set. At the location 880C, the region of interest 820' exactly coincides with the indicated reduced readout pixel set, such that the indicated reduced readout pixel set is not clearly visible.

Figure 11:
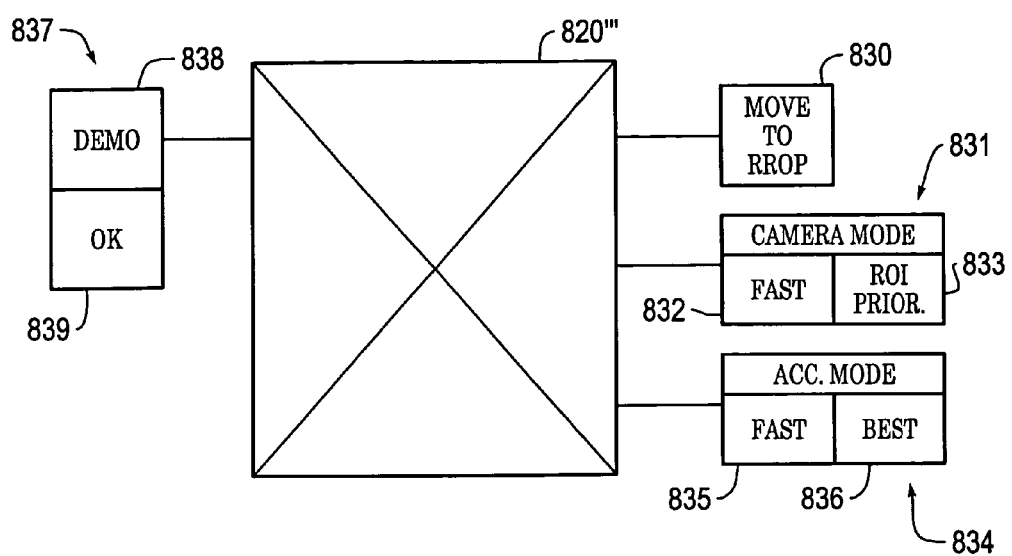
FIG. 11 shows one exemplary embodiment of a graphical user interface auto focus tool widget, along with exemplary embodiments of various control widgets usable to select various modes and operations associated with auto focus operations in a training mode according to this invention.

FIG. 11 shows an exemplary embodiment of a surface auto focus tool GUI widget 820''', along with exemplary embodiments of various control widgets usable to select various modes and operations associated with auto focus operations according to this invention in a training mode. In various exemplary embodiments, the control widget 830 is clicked on with a mouse or otherwise actuated to initiate automatic operations such that a region of interest is moved to at least partially overlap with the region of a fixed reduced readout pixel set, as previously outlined.

In various exemplary embodiments, the control button 832 of the control widget 831 is clicked on with a mouse to select an operating mode where a relatively small reduced readout pixel set is selected in order to provide a relatively faster auto focus image acquisition rate for faster auto focus operations, even if the reduced readout pixel set overlaps only a sufficient portion of a defined region of interest. In contrast, in various exemplary embodiments, the control button 833 is clicked on with a mouse or otherwise actuated to select an operating mode where the reduced readout pixel set, or, if necessary, the overrule mode, is selected, such that the operable set of read out pixels is at least large enough to overlap all of the defined region of interest. This is done in order to provide the best possible estimated best focus position accuracy for an odd-shaped or extensive region of interest, for example.

In various exemplary embodiments, the control button 835 of the control widget 834 is clicked on with a mouse or otherwise actuated to select an auto focus mode that provides a relatively low accuracy mode for determining the estimated best focus position, for example a low accuracy mode approximately as previously described. This also provides relatively fast auto focus operation. In contrast, in various exemplary embodiments, the control button 836 is clicked on with a mouse or otherwise actuated to select an auto focus mode that provides the highest accuracy mode for determining the estimated best focus position, for example a high accuracy mode approximately as previously described.

In various exemplary embodiments, the control button 838 of the control widget 837 is clicked on with a mouse or otherwise actuated to initiate automatic operations that provide an auto focus learn or training mode demonstration that mimics the results of comparable run mode operations, for example, as outlined previously. In various exemplary embodiments, the control button 839 of the control widget 837 is clicked on with a mouse or otherwise actuated to accept the settings of a fully defined or trained auto focus tool, for example, to bypass a training mode auto focus demonstration, or to accept the results indicated by an evaluation image provided as a results of a training mode auto focus demonstration, in order to move on to additional training mode operations.

It should be appreciated that, in various exemplary embodiments, various aspects of the previously described auto focus tools and widgets may be implemented separately or in various combinations. Furthermore, it should be appreciated that, in various exemplary embodiments, alternative forms of the various GUI widgets and controls are apparent. Therefore, the foregoing embodiments are intended to be illustrative only, and not limiting.

Figure 12:
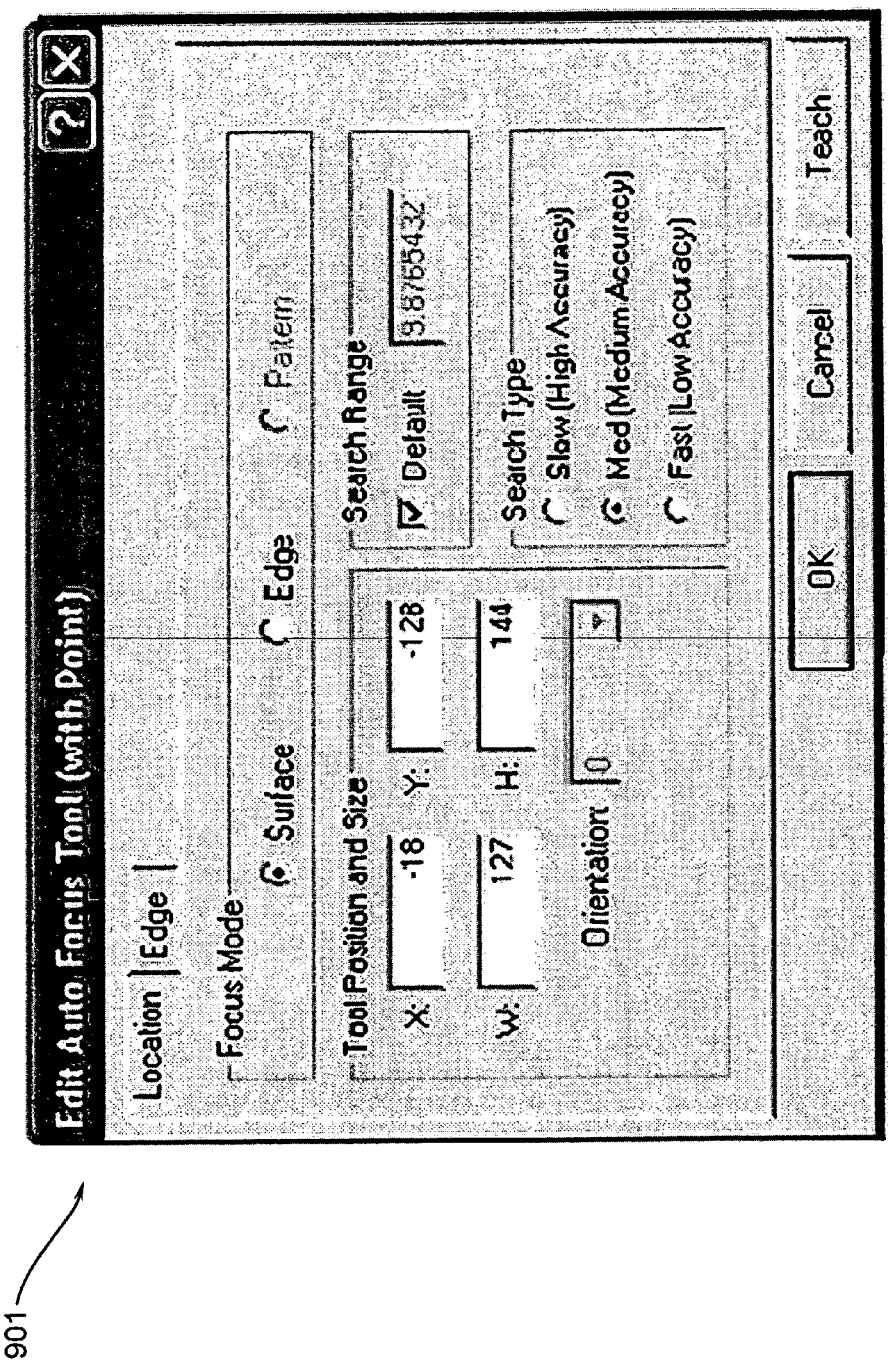
FIG. 12 illustrates one exemplary embodiment of a graphical user interface for an exemplary auto focus tool usable according to this invention.

FIG. 12 illustrates one exemplary embodiment of a graphical user interface window for an exemplary auto focus tool usable according to this invention. Various exemplary embodiments include an exemplary dialog box 901 usable in connection with displaying and/or redefining some of the default auto focus parameters associated with an auto focus GUI tool, such as the edge focus tool 810 or the surface focus tool 820 outlined above. In various exemplary embodiments, a user calls up such a dialog box at various times during manual or training mode operation of a machine vision inspection system. Thereafter, in various exemplary embodiments, the user sets up and runs the auto focus GUI tool using the default parameters at any time.

It should also be appreciated that a similar dialog box is used to display and/or redefine the associated auto focus parameters for an instance of an auto focus GUI tool that is customized for a particular application or workpiece region of interest by the user, graphically or otherwise, as outlined above, in various exemplary embodiments. In a surface focus mode, the dialog box 901 includes displays or entries that indicate the focus mode; the tool position and size, that is, the nominal location and size of the auto focus region of interest; the search range, that is, the total auto focus Z-scan range or focus image range, which, in various exemplary embodiments, is in units that are normalized to be applicable in terms of the depth of field of any usable lens, or the like; and a default search type, that is, the type of speed and accuracy combination, for example, low, medium, or high accuracy, that provides the basis for various selecting of, and or controlling, various other auto focus parameters, as previously discussed in relation to various auto focus accuracy and speed considerations.

In the exemplary embodiment shown in FIG. 12, the user observes and/or changes the Auto Focus Tool settings numerically. It should also be appreciated that, in still other exemplary embodiments, the Auto Focus Tool settings are observed and/or changed graphically. Thus, it should be appreciated that, in various exemplary embodiments, the auto focus systems and methods according to this invention are trained and used manually, or semi-automatically, or automatically, using various easy-to-use text-based and graphical methods, and, in various exemplary embodiments, are similarly customized or adapted to a wide variety of individual applications and workpiece features and regions of interest, by "non-expert" users. Various additional parameters settings or other useful alternative forms of the dialog box 901, or the like, should be apparent. Thus, it should be appreciated that the foregoing embodiment is intended to be illustrative only, and not limiting.

Figure 13:
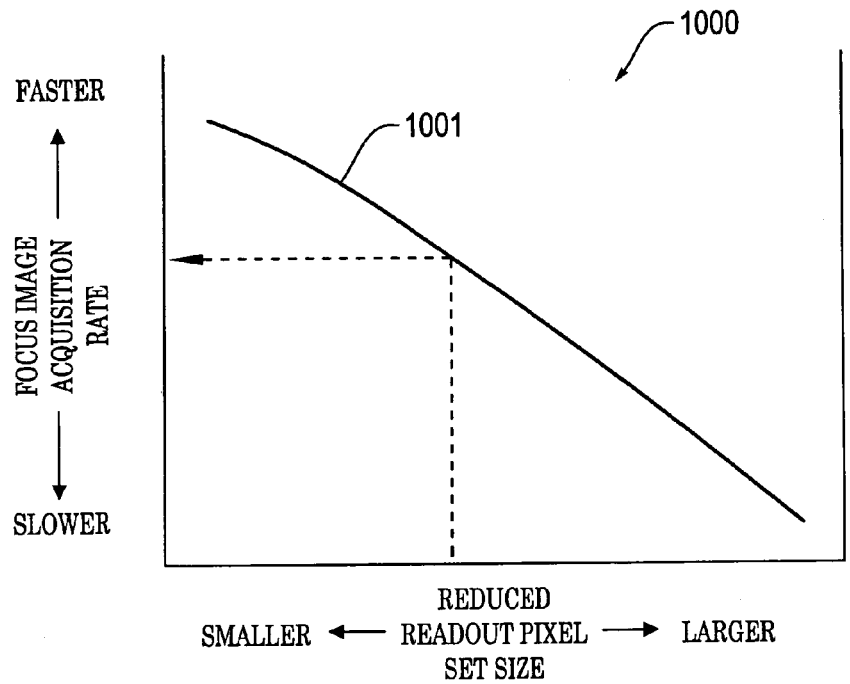
FIG. 13 is a plot illustrating a generic relationship between region of interest size and focus image acquisition rate in various exemplary embodiments according to this invention.

FIG. 13 is a plot 1000 illustrating a generic relationship between the size of a reduced readout pixel set and achievable auto focus image acquisition rate in various exemplary embodiments according to this invention. In various exemplary embodiments, the camera system is operable to select among a plurality of reduced readout pixel sets of different sizes within the overall or maximum camera field of view.

In FIG. 13, the X-axis denotes the size of a reduced readout pixel set. Points to the right on the X-axis indicate a reduced readout pixel set having a larger size, in terms of camera pixel units, or the like. Points to the left on the X-axis indicate a reduced readout pixel set having a smaller size, in terms of camera pixel units, or the like. The Y-axis in FIG. 13 denotes the focus image acquisition rate. Points higher on the Y-axis pertain to faster focus image acquisition rates than points lower on the Y-axis.

The curve 1001 in FIG. 13 represents an inherent or generic operating characteristic of various cameras used in various exemplary embodiments according to this invention. The exemplary theoretical curve 1001 is nearly linear. However, it is not perfectly linear because the functional characteristics of most cameras are not linear due to certain timing "overhead" for camera operations that do not change regardless of the size of the reduced readout pixel set for a particular image. It should be appreciated that a similar actual curve can be established for any similar type of individual camera used according to the principles of this invention. However, the actual curve for one camera will not necessarily be the same as the actual curve for another camera. However, as shown in FIG. 13, generally, smaller reduced readout pixel set sizes result in faster auto focus image acquisition rates in various embodiments according to this invention, where the camera system is operable to select among a plurality of reduced readout pixel sets of different sizes within the overall or maximum camera field of view. Conversely, larger auto focus reduced readout pixel set sizes lead to slower auto focus image acquisition rates, but may be required in order to provide a desired level of accuracy. In order to achieve a highly accurate estimate of the best focus position, in various exemplary embodiments according to this invention, in a high accuracy mode, the reduced readout pixel set sizes are selected in conjunction with a defined region of interest such that on the order of 10,000 pixels are included in the region where the reduced readout pixel set overlaps the region of interest.

Consideration of the camera operating characteristics reflected in FIG. 13 generally facilitates the selection of a desirable combination of auto focus parameters according to the systems and methods of this invention, including the selection of a desirable size for the auto focus region of interest, in order to best obtain a desirable combination or tradeoff of auto focus speed and accuracy.

Figure 14:
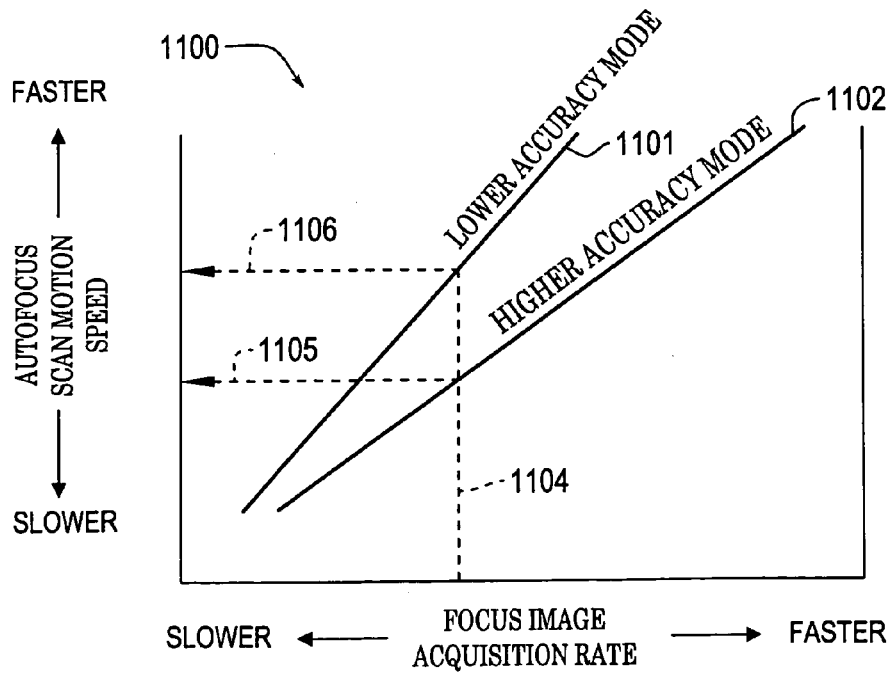
FIG. 14 is a plot illustrating exemplary generic relationships between focus image acquisition rate and auto focus scan motion speed for a lower accuracy mode and a higher accuracy mode, in various exemplary embodiments according to this invention.

FIG. 14 is a plot 1100 illustrating exemplary generic relationships between focus image acquisition rate and auto focus scan motion speed for an exemplary lower accuracy auto focus mode corresponding to the curve 1101 and an exemplary higher accuracy auto focus mode corresponding to the curve 1102, in various exemplary embodiments according to this invention. The X-axis denotes the auto focus image acquisition rate, the same operating characteristic or parameter reflected on the Y-axis in FIG. 13. Thus, in various exemplary embodiments, having determined a focus image acquisition rate as described in connection with FIG. 13, an allowable auto focus scan motion speed is then determined based on the relationships illustrated in FIG. 14.

The Y-axis in FIG. 14 corresponds to an average auto focus scan motion speed along the Z-axis direction for embodiments that use a relatively constant speed while acquiring a sequence of auto focus images, and it approximately corresponds to the maximum auto focus scan motion speed within a desired auto focus image range along the Z-axis direction for embodiments that use acceleration over a significant portion of the desired auto focus image range while acquiring a sequence of auto focus images. In either case, higher locations on the Y-axis in FIG. 14 correspond to faster auto focus scan motion speeds and lower points on the Y-axis in FIG. 14 correspond to slower auto focus scan motion speeds.

It should be appreciated that a particular auto focus image acquisition rate divided by a particular average or maximum auto focus scan motion speed within the desired auto focus image range directly determines the auto focus image sample density, or the maximum auto focus image spacing, respectively, along the Z-axis direction, that is provided for a particular set of auto focus images, and determines the corresponding focus curve. Thus, relatively higher or dense focus curve sample densities, or relatively smaller maximum auto focus image spacings, occur down and to the right on curves in the plot 1100 and relatively lower or sparse focus curve sample densities, or relatively larger maximum auto focus image spacings, occur up and to the left on curves in the plot 1100. Focus curve sampling density and its relation to auto focus accuracy was previously discussed with reference to FIGS. 3 and 4. As is apparent from the preceding discussion, for embodiments that use acceleration during auto focus image acquisition, the magnitude of the maximum auto focus image spacing determines a "non-linear" focus curve sample density that is on the average either more dense corresponding to a smaller maximum spacing, or more sparse corresponding to a larger maximum spacing. Therefore, the accuracy effects related to the magnitude of the maximum auto focus image spacing are understood by analogy with the related discussions of focus curve sample density and accuracy included herein.

Relatively less dense focus curve sampling generally leads to increased uncertainty or error in estimating a focus curve and the associated estimated best focus position. Accordingly, the relatively lower accuracy auto focus mode curve 1101 occurs up and to left, and the relatively higher accuracy auto focus mode curve 1102 occurs down and to the right, in the plot 1100.

Each of the respective auto focus mode curves 1101 and 1102 reflect a respective focus curve sample density that is the same at each point along the respective curve. Thus, operation according to any point along the higher accuracy auto focus mode curve 1102 generally tends to generate a more densely sampled focus versus position curve such as that illustrated in FIG. 3. In contrast, operation according to any point along the lower accuracy auto focus mode curve 1101 generally tends to generate a more sparsely sampled focus versus position curve such as that illustrated in FIG. 4. Although only two auto focus accuracy mode curves are shown in FIG. 14, it should be appreciated that an entire family of curves exists representing relatively higher accuracies and higher sampling density for a focus versus position curve, for lower curves in the plot 1100, and lower accuracies representing lower sampling density in a focus versus position curve, for higher curves in the plot 1100.

It should be appreciated that, other factors being equal, it is generally advantageous to provide the fastest possible auto focus operations. Thus, in various exemplary embodiments according to this invention, it is generally preferable to operate at a point toward the lower left end of any particular auto focus accuracy mode curve that provides a desired level of auto focus precision. Of course, each camera will inherently have a maximum focus image acquisition rate for a particular auto focus region of interest size. This will determine the fastest allowed operating point in various embodiments according to this invention. The line 1104 in FIG. 14 generically represents such a point. Given such an allowed or selected operating point, the corresponding auto focus scan motion speed that provides the required sampling density or maximum auto focus image sample spacing is easily determined and is used as a corresponding auto focus parameter. This is indicated, for example, by the lines 1105 and 1106 in FIG. 14, which generically represent respective allowable auto focus scan motion average speeds, or maximum speeds, corresponding to respective desired sampling densities, maximum spacings, or accuracies.

It should also be appreciated that the analysis outlined above with respect to FIGS. 13 and 14 occurs in a different order in various exemplary embodiments. For example, beginning on the Y-axis in FIG. 14, in various exemplary embodiments, after an auto focus scan motion speed, or maximum speed, is selected or defined, then the focus image acquisition rate is determined from the applicable accuracy mode curve. Using that focus image acquisition rate, in various exemplary embodiments, the allowable reduced readout pixel set size is determined based on the relationships defined in FIG. 13.

Similarly, in various exemplary embodiments one begins by selecting a desired accuracy. In these various embodiments, a curve defining a functional relationship between focus image acquisition rate and the average or maximum auto focus scan motion speed is then defined as shown in FIG. 14. In various exemplary embodiments, having first selected the desired accuracy, an auto focus scan motion speed or a focus image acquisition rate is subsequently defined. Then, in these various embodiments, the other of the auto focus scan motion speed and the focus image acquisition rate is determined.

Thus, it should be appreciated that, after defining two of the three variables, the third variable is determined. It should similarly be appreciated that, in various exemplary embodiments, any ordering of any two of the three variables occurs, leading to the value for the last of the three variables being determined. Thus, consideration of the camera operating characteristics reflected in FIGS. 13 and 14 generally facilitates the selection of a desirable combination of auto focus parameters according to this invention, in order to best obtain a desirable combination or tradeoff of auto focus speed and accuracy.

Figure 15:
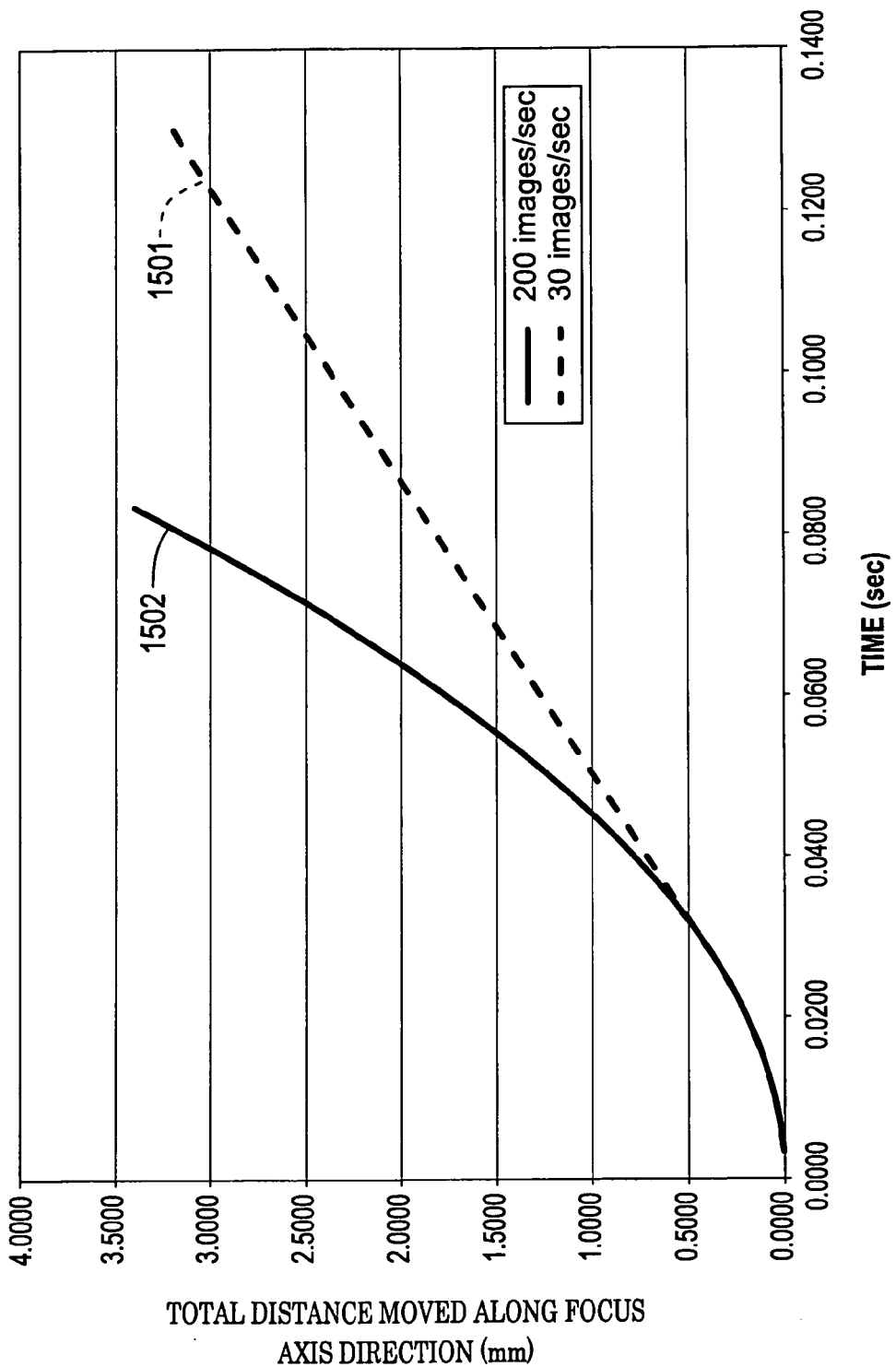
FIG. 15 is a plot comparing motion characteristics associated with a relatively slow auto focus image acquisition rate and a relatively faster auto focus image acquisition rate in various exemplary embodiments according to this invention.

FIG. 15 is a plot comparing a motion curve 1501 that is achievable with a conventional auto focus image acquisition rate of 30 images per second and a motion curve 1502 that is achievable with a relatively faster auto focus image acquisition rate of 200 images per second that is provided using a reduced readout pixel set in various exemplary embodiments according to this invention.

The curves 1501 and 1502 correspond to a low magnification lens having a DOF of 306 microns, and a maximum auto focus image spacing along the focus axis direction of 0.3*DOF=92 microns. This maximum image spacing is usable to provide a medium accuracy estimated best focus position.

The curves 1501 and 1502 show the accumulated distance moved along the focus axis direction over time. Initially, each motion is assumed to start with zero speed at the beginning of a desired auto focus image range of 3.0 mm. Each motion then corresponds to the same nominal acceleration of 0.1 g=980 mm/sec$^2$. This is a typical maximum acceleration provided by a precision machine vision inspection system. After approximately 0.28 seconds, as shown by the curve 1501, the speed cannot be increased further for the conventional auto focus image acquisition rate of 30 images per second. This is because the maximum desired image spacing corresponding to the desired accuracy level is attained at that speed. This is approximately 27.7 mm/sec. Thus, the motion indicated by the curve 1501 continues with a constant speed through the remainder of the auto focus image range of 3.0 mm.

In contrast, the nominal acceleration of 0.1 g=980 mm/sec$^2$ continues for the motion indicated by the curve 1502 through the entire desired auto focus image range of 3.0 mm, for the relatively faster auto focus image acquisition rate of 200 images per second that is provided in various exemplary embodiments according to this invention. The speed reaches a maximum of approximately 77 mm/sec at the end of the desired auto focus image range. This is well short of the allowable maximum speed of approximately 184 mm/sec. The allowable maximum is usable to provide the same maximum auto focus image spacing of 92 microns, at 200 images per second. Several differences and advantages are apparent for the motion curve 1502, corresponding to the relatively faster auto focus image acquisition rate of 200 images per second that is provided using a reduced readout pixel set in various exemplary embodiments according to this invention, in comparison to the motion curve 1501, corresponding to the conventional image acquisition rate of 30 images per second.

It should be appreciated that, for relatively fast image acquisition rates provided using a reduced readout pixel set in various exemplary embodiments according to this invention, it may be desirable for the motion to include acceleration over most or all of the desired auto focus image acquisition range. Provided that the allowable maximum speed is not exceeded, this will generally shorten the overall time required for auto focus operations. It should also be appreciated that when acceleration is used during image acquisition, and particularly when the acceleration is not well controlled and/or known, it may be desirable to use short effective exposure durations, deterministic encoder position latching in relation to the effective image exposure time, and/or various other methods according to this invention, including those outlined above, in order that the non-linear blur-ambiguity in the image is reduced due to the small motion range during the image exposure, and in order that the actual position at the nominal exposure time is accurately determined without the need to infer the position based on time and a constantly-changing ill-defined speed. Such methods provide a fast, simple, and accurate estimate of the best focus position according to this invention, even when high motion speeds and accelerations are used. It should be appreciated that, with the conventional image acquisition rate and correspondingly constrained lower speeds and constant velocities used in many conventional auto focus methods, the potential errors due to blur-ambiguity and position inference are significantly smaller. Therefore, such methods have not found it necessary to use the methods described above for reducing errors associated with higher speeds and significant accelerations along the Z-axis direction during image acquisition.

It should also be appreciated that the auto focus image acquisition along the desired auto focus image range is completed in approximately ⅓ less time for motion curve 1502. In addition, the maximum image spacing actually provided along the motion curve 1502 at 200 images per second is approximately 60% less than that provided along the motion curve 1501 at 30 images per second. Thus, at 200 images per second, the auto focus method is both significantly faster and significantly more accurate. In the exemplary embodiment shown in FIG. 15, the motion over at least a part of the focus image range is at least 2.5 times faster for the relatively fast image rate provided according to this invention than a fastest motion allowable in combination with the conventional image acquisition rate in order to produce adjacent auto focus images that are spaced apart along the focus axis direction by a desired maximum spacing. It should be appreciated that, in various other exemplary embodiments, where the motion used with the image rate provided according to this invention includes a preliminary acceleration before entering the desired auto focus image range to provide higher speeds along the desired auto focus image range, the motion over at least a part of the focus image range is at least 5.0 times faster for an image rate provided according to this invention than a fastest motion allowable in combination with a conventional image acquisition rate in order to produce adjacent auto focus images that are spaced apart along the focus axis direction by the same maximum spacing. In various exemplary embodiments that further increase the speed of auto focus operations according to this invention, such preliminary accelerations are used to provide motion over at least a part of the focus image range that is at least 90% as fast as the fastest motion allowable in combination with a relatively fast image rate provided according to this invention to produce the maximum desired auto focus image spacing.

It should be appreciated that, when there is motion during the exposure time of an auto focus image, each pixel of the camera will accumulate an integrated signal corresponding to all the light received from a point on the workpiece as it traverses over some range along the Z-axis direction during the exposure time. As a first related consideration, for cameras that offer only relatively longer exposure durations, this may lead to unacceptable blur-ambiguity in all auto focus images, as previously outlined, or, conversely, inhibit relatively higher auto focus scan motion speeds and/or relatively fast auto focus operations.

As a second related consideration, even when motion-related blur-ambiguity is otherwise substantially reduced, since various portions of a focus curve are relatively non-linear, the precise Z-axis position that should be associated with the "integrated" auto focus image is not always easily determined to a desired accuracy. This difficulty is compounded when acceleration, and especially a relatively imprecisely known or variable acceleration, is used during auto focus image acquisition. Some uncertainty and error is therefore associated with attributing a Z-position to each integrated auto focus image, even if an encoder position is latched in relation to the image exposure time, as previously outlined. Such cases may exist, particularly when high magnification or small depth of field lenses are in use, and/or a low auto focus accuracy requirement would otherwise allow relatively low sampling densities and high motion speeds.

Thus, in various exemplary embodiments according to this invention, a strobe lighting capability is provided that can address both of these considerations, by providing effective exposure durations that are generally much shorter than can be provided by reasonably priced general purpose machine vision cameras. For example, in one exemplary embodiment suitable for relatively high precision applications, the illumination light(s) source is(are) strobed with a duration such that the workpiece moves a desired maximum amount, or less, during the strobe timing duration. In various exemplary embodiments intended for high precision measuring, the desired maximum amount of workpiece motion is on the order of 0.25 microns. For example, in one exemplary embodiment, a 16.66 microsecond exposure is utilized at a motion speed of 15 mm per second and is adapted to be proportionately shorter as a motion speed becomes proportionately faster, limited only by the ability of the light sources and controllers to output sufficient intensity levels to provide the required total image exposure energy over the decreasing exposure durations.

In various other exemplary embodiments, sufficient measuring accuracy is provided by limiting the maximum motion along the focus axis during an effective auto focus exposure duration to at most 0.5 microns. In yet other exemplary embodiments, sufficient measuring accuracy is provided by adapting the maximum motion along the focus axis during an effective auto focus exposure duration to at most 0.25 times the maximum auto focus image spacing provided in a set of auto focus images along the desired auto focus image range.

It should be appreciated that with short exposure durations, the effective image integration is limited, motion-induced image blur-ambiguity is reduced or eliminated, and the uncertainty in the corresponding Z-axis position is also reduced, increasing both the achievable auto focus speed and accuracy in various exemplary embodiments having short exposure durations.

Figure 16:
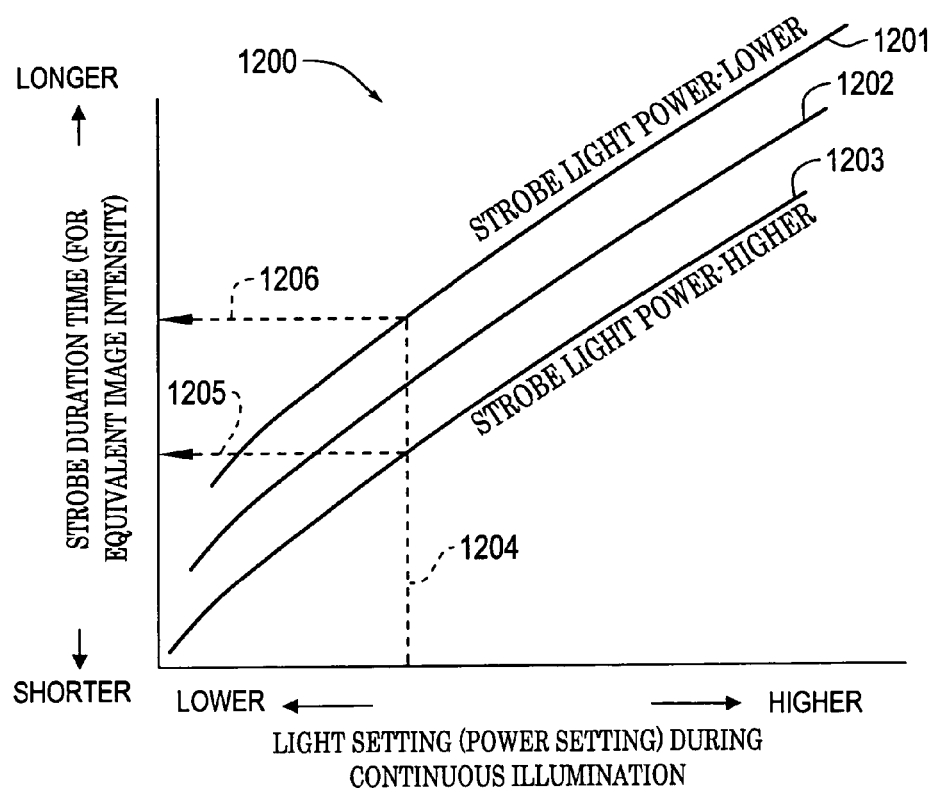
FIG. 16 is a plot illustrating exemplary generic relationships between a light setting (power setting) during a satisfactory continuous illumination and corresponding strobe duration times for a variety of strobe light power levels, according to this invention.

FIG. 16 is a plot 1200 illustrating exemplary generic relationships between a light setting (power setting) during a continuous illumination that is satisfactory during a reference or standard exposure time, and corresponding respective strobe duration times for a number of respective strobe light power levels. The respective strobe light power levels are represented by the lines 1201, 1202 and 1203. Various methods of establishing various desirable strobe light parameters for an auto focus operation have been discussed previously. The following discussion describes various considerations related to one exemplary method in greater detail.

The X-axis in FIG. 16 corresponds to the light setting (power setting) during continuous illumination that produces a satisfactory "stationary" workpiece image that is acquired throughout a reference or standard exposure time, such as the frame rate of conventional cameras. This method of illumination and exposure is conventional, and is well-suited for operation of a vision machine during manual operations and training mode operations that involve a machine operator. As previously mentioned, in various exemplary embodiments, a known light source continuous power setting times the known or standard camera integration period establishes a total exposure illumination energy for that light source. The Y-axis in FIG. 16 corresponds to a strobe duration time necessary for a given strobe light power to achieve an image intensity equivalent to the light setting (power setting) during continuous illumination, that is, to achieve the same total exposure illumination energy for that light source.

It should be appreciated that, in various exemplary embodiments, to a first approximation, a particular total exposure illumination energy (corresponding to a particular continuous illumination level, when using the reference or standard exposure time) divided by a particular strobe light power level directly determines the corresponding required strobe duration time. Each of the respective strobe light power curves 1201, 1202 and 1203 reflects a respective strobe light power setting that is the same at each point along the respective curve. Thus, operation according to any point along the higher power curve 1203 will allow a shorter strobe duration time than operation according to corresponding (vertically aligned) points along either of the lower power curves 1202 and 1201, as illustrated in FIG. 16. Although only three strobe light power curves are shown in FIG. 16, it should be appreciated that an entire family of curves exists representing various other strobe light power levels.

It should also be appreciated that, other factors being equal, it is generally advantageous in various exemplary embodiments according to this invention, to operate at a point toward the lower left end of any strobe light power curve, in order to provide the shortest possible strobe duration and produce images having the least motion-related blur and the smallest possible uncertainty in the corresponding Z-axis position.

It should further be appreciated that each strobe light source will inherently have a maximum allowable power level and, in the absence of other camera response considerations, and the like, this factor may determine the fastest allowed strobe duration in various embodiments according to this invention. The higher power curve 1203 in FIG. 16 generally represents such a maximum power level. Given such a maximum or selected power level that is set as an auto focus parameter, and given a desired operating point, generally indicated by the line 1204 in FIG. 16, the corresponding strobe duration time that provides the required matching total exposure illumination energy is then determined and used as a corresponding auto focus parameter, as indicated by the lines 1205 and 1206 in FIG. 16. The lines 1205 and 1206 generally represent respective strobe duration times corresponding to respective strobe light power levels.

It should also be appreciated that the analysis outlined above with respect to FIG. 16 occurs in a different order in various exemplary embodiments. For example, in various exemplary embodiments, a desired strobe duration time is defined along the Y-axis, then the corresponding required strobe light power is determined at the intersection of the X-axis and Y-axis values in the plot 1200. Consideration of the various auto focus system operating characteristics reflected in FIGS. 13, 14 and 16 generally facilitates the selection of a desirable combination of auto focus parameters according to this invention, in order to best obtain a desirable combination or tradeoff of auto focus speed and accuracy.

Figure 17:
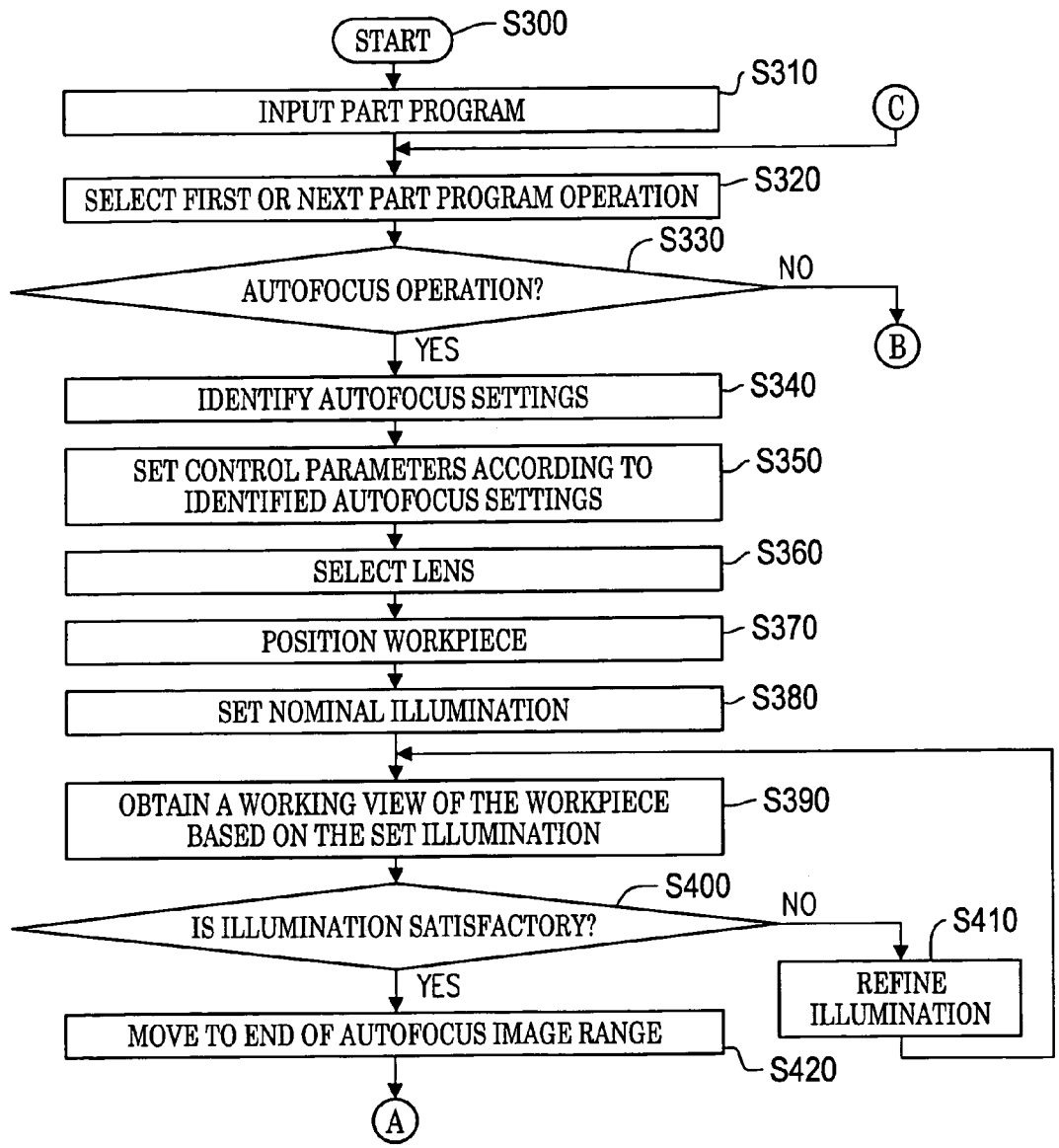
FIGS. 17 and 18 are flowcharts outlining one exemplary embodiment of a method for automatically focusing an image capture device according to this invention.
Figure 18:
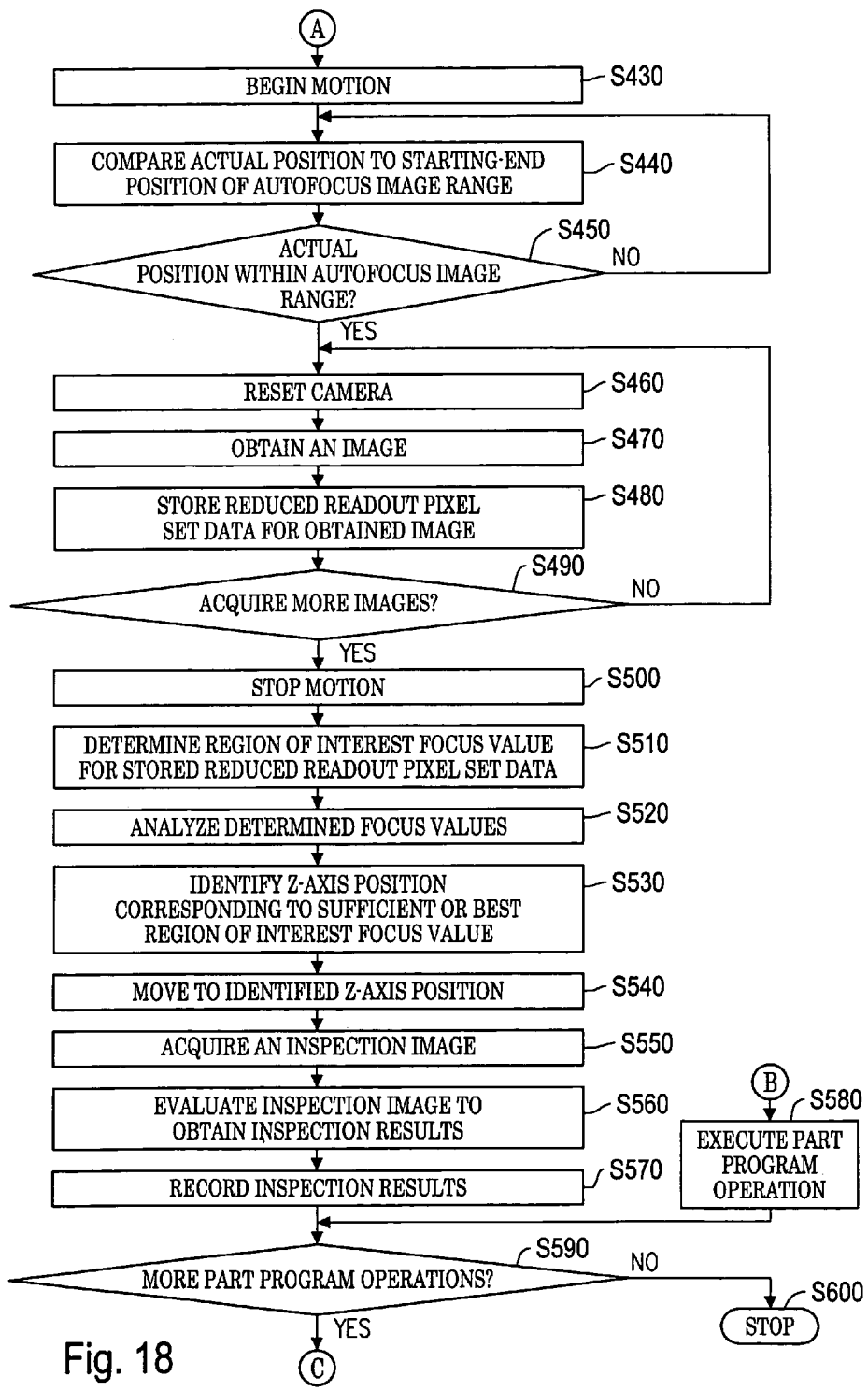

FIGS. 17 and 18 are flowcharts outlining one exemplary embodiment of a method for automatically focusing an image capture device according to this invention, for example, during an automatic run mode of operation. Beginning in step S300, operation of the method continues to step S310, where a part program is input to the machine vision inspection system. Then, in step S320, a first part program operation is selected. Next, in step S330, the first part program operation is evaluated to determine whether or not it is an auto focus operation. If the first part program operation is an auto focus operation, operation proceeds to step S340. If the first part program operation is not an auto focus operation, operation jumps to step S580.

In step S340, the auto focus settings or parameters that may be desirable to completely define various run mode auto focus operations and settings are identified. The auto focus settings that are identified in step S340 correspond to the confirmed set of auto focus variables or parameters and the any other settings that were recorded in step S230 of FIG. 6. Those settings are described above in greater detail in connection with step S230. It should be appreciated that, in addition to information regarding the lens selected, the auto focus settings may also include information regarding various lens parameters as they relate to any lens-specific adjustments or set-up operations related to the various auto focus settings. Next, in step S350, the parameters and/or configuration of various machine vision inspection system components are set according to the auto focus settings identified in step S340. For example, in step S350 various settings or control parameters related to the dimensions of the region of interest, the desired auto focus accuracy and/or sample density and/or maximum auto focus image spacing along the desired auto focus image range, the illumination settings, the auto focus scan motion and/or maximum speed and scanned range, control parameters based on the parameters of the selected lens, the desired auto focus image range, and the like, are set. Operation then continues to step S360.

In step S360, the lens corresponding to the lens settings identified in step S340 and set in step S350, is selected and positioned in the optical path. Next, in step S370, the particular region of interest of the workpiece is appropriately positioned to a nominal position in the field of view. Then, in step S380, the nominal illumination is set. The nominal illumination set in step S380 corresponds to the nominal illumination stored in step S180, described above in connection with FIG. 6. Operation then proceeds to step S390.

In step S390, a working view of the workpiece is obtained based on the illumination set in step S380. Then, in step S400, the working view is evaluated to determine whether or not the illumination is satisfactory. For example, in various exemplary embodiments, the results of an automatically executed multi-area image quality tool are used for the evaluation. If the illumination is determined to be unsatisfactory in step S400, operation proceeds to step S410. Otherwise, operation jumps to step S420. In step S410, the illumination is refined. For example, in various exemplary embodiments this refinement is based on the results of the automatically executed multi-area image quality tool, or by any other applicable known or later developed means for improving illumination settings. Operation then returns to step S390, where another working view of the workpiece is obtained based on the refined illumination.

It should be appreciated that, in various other exemplary embodiments, steps S390–S410 are omitted. For example, in various exemplary embodiments, after the method is implemented several times, the inspection results, or user observation, may indicate that the nominal illumination settings set in step S380 always result in a satisfactory illumination. It may be preferable in such a case to omit steps S390–S410 as an unnecessary confirmation of the illumination. Thus, in those exemplary embodiments, where steps S390–S410 are omitted, operation proceeds directly from step S380 to step S420.

In step S420, the camera is moved to a position near one end of an operative auto focus image range. For example, in various exemplary embodiments, this corresponds to a displacement relative to a current nominal Z-axis position of the region of interest, to a position approximately 0.5–2.0 times the depth of field of the current lens beyond a maximum expected variation or tolerance in the Z-position of the region of interest. Then, in step S430, the camera begins moving along the Z-axis. In various exemplary embodiments, the camera motion includes a preliminary acceleration or speed outside of the operative auto focus image range and is continuous and at a nominally constant speed during auto focus image acquisition in the desired auto focus image range. In various exemplary embodiments, the camera motion is continuous and accelerates through some or all of the desired auto focus image range. In various other embodiments according to this invention, the camera motion is discontinuous and/or includes other speed variations, provided that operable auto focus images are acquired.

Next, in step S440, in various embodiments where the camera is not moved directly to the operative starting-end position of the operative auto focus image range in step S420, for example when a preliminary acceleration is provided beginning outside of the operative auto focus image range, the current actual Z-axis position is compared to an operative starting-end position used to govern the range used for acquiring auto focus images. Operation then continues to step S450.

In step S450, a determination is made whether the comparison of the actual Z-axis position and the operative starting end position indicate that the actual Z-axis position is within the operative auto focus image acquisition range. If the actual camera position, the actual Z-axis position, is not within the operative auto focus image acquisition range, operation returns to step S440, where the then-current actual camera position is compared to the operative starting end position. Otherwise, once the current actual camera position is within the operative auto focus image acquisition range, operation continues to step S460, where a control signal is sent to reset the camera in preparation for an auto focus image acquisition. Next, in step S470, an auto focus image including at least the reduced readout pixel set is acquired. It should be appreciated that in various exemplary embodiments, as previously described, a current Z-axis position value is latched or acquired in correspondence to the acquired auto focus image. Operation then continues to step S480.

In step S480, the reduced readout pixel set is output to the control system portion of the machine vision system and stored. In various exemplary embodiments, the corresponding Z-axis position value is also stored. Then, in step S490, a determination is made whether there are more auto focus images to be acquired along the operative auto focus image range. In various exemplary embodiments, this comprises determining whether a then-current actual camera position is still within the operative auto focus image range. In various other exemplary embodiments, this includes determining whether a predetermined number of auto focus images known to span the operative auto focus image range, for example, based on a known image acquisition rate and a known auto focus motion profile, have been acquired. If there are more auto focus images to be acquired along the operative auto focus image range, operation returns to step S460 where, in various exemplary embodiments, a control signal is sent to reset the camera in preparation for another auto focus image acquisition. Otherwise, operation proceeds to step S500, where the motion of the camera in the Z-axis is stopped or redirected for a next operation.

In the various exemplary embodiments of the auto focusing operations described above in connection with steps S460–S480, each auto focus image is obtained based on a trigger signal that is sent to the camera. In various exemplary embodiments, these signals are provided by the Galil motion control card #DMC-1730, or the like, based on a predetermined timing that is compatible with or determined based on an image acquisition rate that is compatible with the operative reduced readout pixel set and the operative auto focus motion. In various other exemplary embodiments, these signals are provided based according to a default timing or a free-running timing that is compatible with, or determined based on, an operative image acquisition rate for the reduced readout pixel set, and that is compatible with the operative auto focus motion. In other exemplary embodiments, the triggers signals are based on determined auto focus image positions instead of on time. In still other exemplary embodiments, the images are obtained based on "ready signals" or a default timing designed to maximize the focus image acquisition rate, as previously outlined with reference to FIGS. 13 and 14, for example.

In various exemplary embodiments, a determination between these various trigger methods, and the determination of the corresponding governing auto focus variable or parameters, is based on the settings to the variables defined and determined in steps S190–S210 of FIG. 6. In still other exemplary embodiments, as described in greater detail above in connection with FIG. 5, auto focus images are obtained based on a cascade of signals initiated by a trigger signal sent to a strobe lighting controller, which, in various exemplary embodiments also controls the latching of corresponding actual Z-axis position values. In any case, next, in step S510, a region of interest focus value is determined for pixels included in the region of interest for at least some of the stored sets of reduced readout pixel set data. Then, in step S520, the region of interest focus values determined in step S510 are analyzed.

In various exemplary embodiments, the analysis includes comparing the focus values and identifying the maximum determined focus value. In other exemplary embodiments, the analysis includes fitting an estimated focus curve, or a portion of an estimated focus curve, or the like, to the determined focus values, by any now known or later developed method. For example, in various exemplary embodiments, a polynomial of 2nd order or higher is fit to at least some of the determined focus values located at a number of positions bounding and including the maximum determined focus value. In various exemplary embodiments, the polynomial is a $5^{th}$ order polynomial.

Next, in step S530, an estimated best focus position that estimates the true peak of the focus curve is determined. In various exemplary embodiments where the maximum determined focus value was determined in the step S520, a sufficiently accurate or relatively approximate region of interest focus position is determined as the estimated best focus position corresponding to that focus value. In other various embodiments having a higher accuracy, where an estimated focus curve, or a portion of an estimated focus curve, was fitted to the determined focus values in the step S520, an accurate or relatively less approximate estimated best focus position is determined as the Z-axis position corresponding to the peak, or line of symmetry, of the fitted focus curve.

The peak or line of symmetry of the fitted focus curve is determined by any now known or later developed method. For example, in various exemplary embodiments where a polynomial is fit to the determined focus values, the location of the peak is determined from the zero crossing of the first derivative of the fit polynomial, or the like. It should be appreciated that numerous other alternative embodiments are usable in place of the operations of the steps S520 and S530, provided that a sufficiently or highly accurate estimated best focus position is determined for the region of interest. Operation then continues to step S540.

In various exemplary embodiments of the auto focusing method, all images are obtained before a region of interest focus value is determined for any of the stored images. Likewise, in various exemplary embodiments, all of the region of interest focus values determined in step S510 are determined before any analysis of the determined focus values occurs in step S520. However, in various other exemplary embodiments, the operations of the step S520 are performed in parallel with the operations of the step S510. This provides a faster overall throughput for the auto focus operations and determines a desired inspection image in less time, in various exemplary embodiments.

Similarly, in still other exemplary embodiments, some of the operations of step S510 occur between the operations of the steps S480 and S490. In this embodiment, the region of interest focus value is determined for each stored image immediately after the image is stored, without waiting for all subsequent images to be obtained and stored. Likewise, in yet other exemplary embodiments, some of the operations of the step S520 occur between the operations of the steps S480 and S490. In such exemplary embodiments, not only is the region of interest focus value determined for each stored image immediately after that image is stored, but analysis of the determined focus values is initiated while the acquisition and storing of subsequent images is ongoing.

In step S540, if a sufficiently complete and focused inspection image is not already included among the set of acquired auto focus images, the camera is moved to the estimated best focus position identified in step S530. Then, in step S550, an inspection image of at least the region of interest of the workpiece is acquired. In various exemplary embodiments, the inspection image includes the entire filed of view. In various exemplary embodiments, the inspection image obtained in step S550 corresponds to the best focus position available for that image as a result of the systems and methods according to this invention. Next, in step S560, the inspection image is evaluated to obtain inspection results. Then, in step S570, the inspection results obtained in step S560 are recorded. Operation then jumps to step S590. In contrast, in step S580, the next, non-auto focus operation of the part program is executed. Operation then continues to step S590.

In step S590, a determination is made whether there are any more part program operations remaining to be executed. If there are any part program operations to be executed, operation returns to step S320. Otherwise, operation continues to step S600, where operation of the method stops. It should be appreciated that in various exemplary embodiments, the estimated best focus position determined in step S530 is used as an inspection coordinate for a feature in the region of interest corresponding to the auto focus operation. Furthermore, in various exemplary embodiments, no other inspection operation is required in the region of interest, and at least the steps S540 and S550 are omitted in various embodiments.

As previously outlined, in various alternative embodiments, to perform or replace at least some of the operations described above in relation to the steps S460–S490, a set of auto focus images is obtained based on a cascade of signals initiated by a trigger signal sent to a strobe lighting controller. In various exemplary embodiments, the strobe lighting controller also controls the latching of corresponding actual Z-axis position values.

In greater detail, in various exemplary embodiments of strobe lighting mode auto focus operations, initially the positions of all position encoders connected to a motion control card are polled simultaneously at a high frequency, using inherent capabilities of the motion control card. When the Z-axis position falls within the operative auto focus image range, for example, when it exceeds a determined position value corresponding to an end of the operative auto focus image range, the motion control card outputs a trigger signal. Next, the output trigger signal is input to the system framegrabber, which is operated in an externally triggered mode during the strobe lighting auto focus mode. Then, the framegrabber issues a first signal that initiates an asynchronous reset of the system camera. This initiates the image integration sequence on the camera.

In various exemplary embodiments, after a brief delay that is programmed into the framegrabber and that is established based on various known characteristics of the vision system components, such as, for example, the camera integration time, the Z-axis scan motion, and various inherent circuit delays, the framegrabber then outputs a second control signal, having a defined duration, to the strobe lighting controller. In response to the second control signal, the strobe lighting controller initiates an illumination light pulse from one or more previously determined illumination sources corresponding to the defined duration. In various exemplary embodiments, the second control signal defines both the power level and the duration of the light pulse. In various other exemplary embodiments, the second control signal controls the duration, while the light source is driven according to a fixed or default power level. In general, the strobe light power level and pulse durations are typically determined in combination with various other factors that influence the image characteristics.

In various exemplary embodiments, the second control signal is also used to latch a current Z-axis position at a time corresponding to the timing of the second control signal. Thus, in various exemplary embodiments, the second control signal is connected directly to the motion control card's high-speed position capture latch input, which may be triggered by the rising edge, or start, of the second control signal. In response, the motion control card latches the current position values of the optical assembly, in various exemplary embodiments. The current position values are thus acquired and stored in relation to the corresponding workpiece inspection image for later retrieval and analysis.

In various exemplary embodiments, where timing is not critical, the framegrabber inputs the resultant video data from the camera, output in response to a data read signal, so that the data, that is, the workpiece inspection image, is stored in relation to the corresponding Z-axis position values for later retrieval and analysis. It should be appreciated that the effective image exposure timing and duration is, of course, controlled by the time and duration of the strobe pulse at the predetermined time during the integration sequence on the camera. Thus, in various exemplary embodiments, the strobe timing and duration in relation to the timing of the latching of the Z-axis positions are used in combination with a known Z-axis scan speed during the strobe duration. This further refines the relation between a particular image having a particular focus value and the corresponding Z-axis position, in order to minimize the errors and uncertainties in that relation prior to determining the estimated best focus position for an inspection image.

It should be appreciated that, in various exemplary embodiments, the foregoing cascade of various trigger signals and timing durations all have timings that are controlled by various hardwired connections and/or high speed clocks which are not subject to significant unpredictable software delays or timing latencies. Thus, the various exemplary embodiments according to this invention allow very good combinations of auto focus speed and accuracy, even in a machine vision system operating environment that generally includes such unpredictable software delays or timing latencies in other less repetitive and/or less critical aspects of the machine vision system operation.

It should be appreciated that workpiece inspection images acquired according to various embodiments of the systems and methods described above can be provided with far shorter exposure times, and at a far higher rate of image acquisition for a series of images than is possible with the components and methods used in conventional precision machine vision inspection systems, and associated methods of automatically focusing an image capturing device. It should also be appreciated that when a series of workpiece features are to be imaged and inspected at high magnification, using continuous motion according to the principles of this invention, each highly magnified field of view has a very small depth of field that is traversed and passed by very quickly. Accordingly, the short exposure times, and high image acquisition rates provided by the methods described above are particularly important for acquiring highly magnified precision workpiece auto focus and inspection images with increased throughput.

It should similarly be appreciated that, although the synchronization operations described in connection with the exemplary embodiments utilizing strobe lighting make use of the inherent features of various exemplary system components, in various other exemplary embodiments similar synchronization features and/or signals may be provided by a separate timing circuit implemented according to known digital timing circuit techniques. Such a circuit may be included as a portion of the controller 120, in various exemplary embodiments.

Likewise, it should be appreciated that certain existing machine vision inspection systems can employ various embodiments of the systems and methods according to this invention with minimal or no "retrofit" modifications to such existing machines, and the auto focus capability, robustness and throughput of such machines may still be increased according to the principles of this invention. In various exemplary embodiments, only the addition of machine vision inspection software methods and/or modifications according to the principles of this invention are included in the retrofit modifications.

While this invention has been described in conjunction with the exemplary embodiments outlined above, various alternatives, modifications, variations, improvements, and/or substantial equivalents, whether known or that are or may be presently unforeseen, may become apparent to those having at least ordinary skill in the art. Accordingly, the exemplary embodiments of the invention, as set forth above, are intended to be illustrative, not limiting. Various changes may be made without departing from the spirit and scope of the invention. Therefore, the claims as filed and as they may be amended are intended to embrace all known or later-developed alternatives, modifications variations, improvements, and/or substantial equivalents.

What is claimed is:

1. A method for operating a precision machine vision inspection system to determine an estimated best focus position that is at least approximately a best focus position usable for inspecting a region of interest of a workpiece, the precision machine vision inspection system comprising:

an imaging system comprising:
  a camera having a pixel set corresponding to a full field of view of the camera, the camera operable to output the pixel values of at least one configuration of a reduced readout pixel set, the at least one configuration of a reduced readout pixel set corresponding to substantially less than the full field of view of the camera along at least one dimension of the field of view of the camera, and
  at least one lens configuration;
a plurality of controllable motion axes including a focus axis, the focus axis including a focus axis position sensor;
a control system portion; and
a workpiece stage that carries the workpiece, wherein at least one of the workpiece stage and the imaging system is movable to provide relative motion with respect to the other at least along the focus axis, the method comprising:
overlapping at least a majority of the region of interest and at least part of a reduced readout pixel set in the field of view of the camera;
providing a motion, the motion including traversing a focus image range along the focus axis direction using continuous motion;
inputting an auto focus image into the camera during the continuous motion, the auto focus image having a respective effective exposure time and exposure duration;
outputting the pixel values of the reduced readout pixel set of the auto focus image to the control system portion during the continuous motion, the output pixel values of the auto focus image corresponding to substantially less than the full field of view of the camera along at least one dimension of the field of view of the camera;
repeating the inputting and outputting steps to provide data for a plurality of reduced readout pixel sets corresponding to a plurality of auto focus images distributed along the focus image range;
determining respective positions along the focus axis for at least some of the plurality of auto focus images; and
determining an estimated best focus position that is at least approximately the best focus position usable for inspecting a region of interest of a workpiece based on at least some of the data for a plurality of reduced readout pixel sets and at least some of the respective positions along the focus axis for at least some of the plurality of auto focus images, wherein:
the output pixel values of the outputting operation are output in a time that is substantially less than a time required for outputting the full pixel set corresponding to a full field of view of the camera;
repeating the inputting and outputting steps is performed within a reduced time that is less than a standard time that corresponds to inputting an input image and outputting a pixel set corresponding to a full field of view of the camera;
the plurality of auto focus images are distributed along the focus image range in a manner depending at least partially on the reduced time and the provided motion such that a maximum spacing along the focus axis between the respective positions of adjacent auto focus images is operational for determining the estimated best focus position that is at least approximately the best focus position to a desired level of accuracy; and
the motion over at least a part of the focus image range is substantially faster than a fastest motion allowable in combination with the standard time in order to hypothetically produce adjacent auto focus images that are spaced apart along the focus axis direction by that maximum spacing between the respective positions of adjacent auto focus images.

2. The method of claim 1, wherein the motion over at least a part of the focus image range is at least 2.5 times faster than a fastest motion allowable in combination with the standard time in order to hypothetically produce adjacent auto focus images that are spaced apart along the focus axis direction by that maximum spacing between the respective positions of adjacent auto focus images.

3. The method of claim 1, wherein the motion over at least a part of the focus image range is at least five times faster than a fastest motion allowable in combination with the standard time in order to hypothetically produce adjacent auto focus images that are spaced apart along the focus axis direction by that maximum spacing between the respective positions of adjacent auto focus images.

4. The method of claim 1, wherein the motion over at least a part of the focus image range is at least 90% as fast as the fastest motion allowable in combination with the reduced time in order to hypothetically produce a maximum spacing between the respective positions of adjacent auto focus images that is equal to a predetermined limit.

5. The method of claim 4, wherein the method is operable in at least one a lower accuracy mode and at least one higher accuracy mode, and when the method is operated in at least one lower accuracy mode, the value of the predetermined limit is equal to at least 0.2 times and at most 0.5 times the full-width-half-maximum width of the expected nominal focus curve width for a current lens configuration, and, when the method is operated in at least one higher accuracy mode, the value of the predetermined limit is equal to at least 0.02 times and at most 0.1 times the full-width-half-maximum width of the expected nominal focus curve width for a current lens configuration.

6. The method of claim 4, wherein the method is operable in at least one a lower accuracy mode and at least one higher accuracy mode, and when the method is operated in at least one lower accuracy mode, the value of the predetermined limit in microns is equal to at least $(0.18/NA^2)$ and at most $(0.45/NA^2)$, where NA is an effective numerical aperture of a current lens configuration, and, when the auto focus tool is operated in at least one higher accuracy mode, the value of the predetermined limit in microns is equal to at least $(0.018/NA^2)$ and at most $(0.09/NA^2)$.

7. The method of claim 1, wherein the at least a majority of the region of interest comprises all of the region of interest.

8. The method of claim 1, wherein the at least one configuration of a reduced readout pixel set comprises a set of pixels having at least one of a selectable location and a selectable range along at least one dimension of the field of view of the camera and the overlapping step comprises operating the camera according to at least one of a selected location and a selected to range that overlaps the reduced readout pixel set with the at least a majority of the region of interest.

9. The method of claim 1, wherein the at least one configuration of a reduced readout pixel set comprises a set of pixels having a span that is fixed relative to the field of view of the camera along the at least one direction and the aligning step comprises positioning of the workpiece relative to the imaging system according to a position that overlaps the at least a majority of the region of interest with the reduced readout pixel set.

10. The method of claim 1, wherein determining respective positions along the focus axis comprises determining a respective position output of at least the focus axis position sensor corresponding to each of the at least some of the plurality of auto focus images, each respective position output having a timing that is correlated to the corresponding respective effective exposure time.

11. The method of claim 10, wherein the respective position output and the output pixel values corresponding to each of the at least some of the plurality of auto focus images are stored by the control system portion and determining the focus axis position is completed after all of the respective position outputs and the output pixel values corresponding to each of the at least some of the plurality of auto focus images are stored.

12. The method of claim 10, wherein a respective first control signal determines the start of each effective exposure duration and determining the respective position output comprises capturing the respective position output with a deterministic timing relative to the respective first control signal.

13. The method of claim 12, wherein the respective first control signal determines the start of one of a) a respective electronic shutter duration of the camera that determines the respective effective exposure duration, and b) a respective strobe illumination duration that determines the respective effective exposure duration.

14. The method of claim 13, wherein at least one of the continuous motion and the respective effective exposure duration are provided such that for each respective auto focus image the maximum motion along the focus axis is at most equal to at least one of a) a predetermined exposure motion limit, b) 0.25 times the predetermined spacing limit, c) 0.5 microns, and d) 0.25 microns.

15. The method of claim 14, wherein the continuous relative motion includes an acceleration and at least some of the auto focus images are input during the acceleration.

16. The method of claim 1, wherein the continuous relative motion includes an acceleration and at least some of the auto focus images are input during the acceleration.

17. The method of claim 16, wherein at least one of the continuous motion and the respective effective exposure duration are provided such that for each respective auto focus image the maximum motion along the focus axis is at most equal to at least one of a) a predetermined exposure motion limit, b) 0.25 times the predetermined spacing limit, c) 0.5 microns, and d) 0.25 microns.

18. The method of claim 1, comprising:
performing at least the providing, inputting, outputting, repeating, determining respective positions, and determining the estimated best focus position steps a first time over a relatively larger focus image range with a relatively larger maximum spacing, wherein determining the estimated best focus position comprises determining a relatively more approximate focus position; and
performing at least the providing, inputting, outputting, repeating, determining respective positions, and determining the estimated best focus position steps a second time over a relatively smaller focus image range including the determined relatively more approximate focus position with a relatively smaller maximum spacing, wherein determining the estimated best focus position step comprises determining a relatively less approximate focus position, and the less approximate focus position is used for inspecting the workpiece, at least in the region of interest.

19. The method of claim 1, wherein the focus axis position is set at the determined estimated best focus position that is at least approximately the best focus position, an inspection image is acquired at that position, and that inspection image is used for inspecting the workpiece, at least in the region of interest.

20. The method of claim 1, wherein the determined estimated best focus position that is at least approximately the best focus position is used as a feature coordinate value for a feature to be inspected in the region of interest without actually setting the focus axis position of the precision machine vision inspection system at that position.

21. The method of claim 20, wherein the respective reduced readout pixel set data having the respective position along the focus axis that is closest to the determined estimated best focus position that is at least approximately the best focus position is used for inspecting the workpiece in the region of interest without actually setting the focus axis position of the precision machine vision inspection system at that focus position.

22. A method of training mode operation for a precision machine vision inspection system in order to determine set of machine control instructions usable to automatically determine an estimated best focus position that is at least approximately a best focus position usable for inspecting a region of interest of a workpiece, the precision machine vision inspection system comprising:
an imaging system comprising:
a camera having a pixel set corresponding to a full field of view of the camera, the camera operable to output the pixel values of at least one configuration of a reduced readout pixel set, the at least one configuration of a reduced readout pixel set corresponding to substantially less than the full field of view of the camera along at least one dimension of the field of view of the camera, and
at least one lens configuration;
a plurality of controllable motion axes including a focus axis, the focus axis including a focus axis position sensor;
a control system portion;
a workpiece stage that carries the workpiece, wherein at least one of the workpiece stage and the imaging system is movable to provide relative motion with respect to the other at least along the focus axis; and
a graphical user interface comprising a display portion usable to display workpieces images, and a plurality of user interface elements comprising at least one auto focus tool, the method comprising:
defining a region of interest and a reduced readout pixel set overlapping with at least a majority of the region of interest, wherein:
at least the region of interest is defined using an auto focus widget associated with the operation of an auto focus tool, the auto focus widget positionable on a displayed image of the workpiece,
the output pixel values correspond to substantially less than the full field of view of the camera along at least one dimension of the field of view of the camera, and
the pixel values of the reduced readout pixel set of an auto focus image can be output to the control system portion in a time that is substantially less than a time required for outputting the full pixel set corresponding to a full field of view of the camera;
defining a set of auto focus parameters usable to determine a set of auto focus operations for the region of interest;

determining a set of auto focus operations for the region of interest, comprising:
  determining a run mode focus image range,
  determining a run mode auto focus motion; the auto focus motion including traversing the focus image range along the focus axis direction using continuous motion, and
  determining a run mode illumination level and exposure duration usable for inputting an auto focus image into the camera during the continuous motion;
  providing operations to determine a repetitive inputting of respective auto focus images and outputting of respective data for a plurality of reduced readout pixel sets corresponding to a plurality of auto focus images distributed along the focus image range during the continuous motion, each of the respective auto focus images having an effective exposure time and exposure duration;
  providing operations to determine respective positions along the focus axis for at least some of the plurality of auto focus images; and
  providing operations to determine the estimated best focus position that is at least approximately the best focus position usable for inspecting a region of interest of a workpiece based on at least some of the data for a plurality of reduced readout pixel sets and at least some of the respective positions along the focus axis for at least some of the plurality of auto focus images, wherein:
  the determined repetitive inputting of respective auto focus images and outputting of respective data for a plurality of reduced readout pixel sets is performed within a reduced time that is less than a standard time that corresponds to inputting an input image and outputting a pixel set corresponding to a full field of view of the camera;
  the plurality of auto focus images are distributed along the focus image range in a manner depending at least partially on the reduced time and the auto focus motion such that a maximum spacing along the focus axis between the respective positions of adjacent auto focus images is operational for determining the estimated best focus position that is at least approximately the best focus position to a desired level of accuracy; and
  the auto focus motion is substantially faster along the focus axis over at least a part of the focus image range than a fastest motion allowable in combination with the standard time in order to hypothetically produce that maximum spacing between the respective positions of adjacent auto focus images.

23. The method of claim 22, wherein the auto focus motion is at least 2.5 times faster along the focus axis over at least a part of the focus image range than a fastest motion allowable in combination with the standard time in order to hypothetically produce that maximum spacing between the respective positions of adjacent auto focus images.

24. The method of claim 22, wherein the auto focus motion over at least a part of the focus image range is at least 90% as fast along the focus axis as the fastest motion allowable in combination with the reduced time in order to hypothetically produce a maximum spacing between the respective positions of adjacent auto focus images that is equal to a predetermined limit.

25. The method of claim 22, wherein the maximum spacing along the focus axis between the respective positions of adjacent auto focus images is at most equal to a predetermined limit.

26. The method of claim 25, wherein the predetermined limit is determined based on at least one lens characteristic of a current lens configuration.

27. The method of claim 26, wherein the lens characteristic includes one of a) an expected nominal focus curve width for the current lens configuration and b) a characteristic that at least partially determines an expected nominal focus curve width for the current lens configuration, and the predetermined limit is effectively approximately proportional to the expected nominal focus curve width for the current lens configuration.

28. The method of claim 25, wherein the auto focus tool includes a plurality of accuracy modes and when the auto focus tool is operated in a first one of the accuracy modes the value of the predetermined limit is equal to at least 0.2 times and at most 0.5 times the full-width-half-maximum width of the expected nominal focus curve width for a current lens configuration and when the auto focus tool is operated in a second one of the accuracy modes the value of the predetermined limit is equal to at least 0.02 times and at most 0.1 times the full-width-half-maximum width of the expected nominal focus curve width for a current lens configuration.

29. The method of claim 25, wherein the auto focus tool includes a plurality of accuracy modes and when the auto focus tool is operated in a first one of the accuracy modes the value of the predetermined limit in microns is equal to at least $(0.18/NA^2)$ times and at most $(0.45/NA^2)$, where NA is an effective numerical aperture of a current lens configuration and when the auto focus tool is operated in a second one of the accuracy modes the value of the predetermined limit in microns is equal to at least $(0.018/NA^2)$ times and at most $(0.09/NA^2)$.

30. The method of claim 22, wherein the control system portion automatically defines a reduced readout pixel set that overlaps with at least a majority of the region of interest.

31. The method of claim 30, wherein the reduced readout pixel set is substantially identical to the region of interest.

32. The method of claim 22, wherein the at least one configuration of a reduced readout pixel set includes a reduced readout pixel set having a predetermined size and shape and for at least a portion of the time that the auto focus tool widget is displayed on the image of the workpiece, a widget having the predetermined size and shape is also displayed to indicate the location of the reduced readout pixel set.

33. The method of claim 32, wherein a region of interest indicating portion of the auto focus tool widget includes a display of the region of interest boundaries, and when a boundary of the region of interest indicating portion extends outside of the indicated location of the reduced readout pixel set, a graphical user interface element is automatically activated to highlight that condition.

34. The method of claim 22, wherein the at least one configuration of a reduced readout pixel set includes a configuration having at a span along at least one direction that is fixed relative to the field of view of the camera along the at least one direction, and when a region of interest is defined outside of the span, the control system portion is operable to automatically generate at least one machine control instruction that positions the at least a majority of the region of interest within the span along the at least one direction.

35. The method of claim 34, wherein the graphical user interface displays a control widget operable by a user to trigger the operation that automatically generates the at least one machine control instruction that positions the at least a majority of the region of interest within the span along the at least one direction.

36. The method of claim 22 wherein the determination of respective positions along the focus axis comprises inputting to the control system portion a respective position signal of at least the focus axis position sensor for at least some of the plurality of auto focus images, each respective position signal corresponding to an effective timing that is correlated to the corresponding respective effective exposure time.

37. The method of claim 36, wherein the continuous motion includes an acceleration and at least some of the auto focus images are input during the acceleration.

38. The method of claim 22, wherein the precision machine vision inspection system further comprises at least one controllable illumination source that is operable in both a constant illumination mode and a strobe illumination mode, and determining a set of auto focus parameters comprises:

operating at least one controllable illumination source in the constant illumination mode during a known camera exposure duration to determine an acceptable total exposure illumination energy usable for inputting an auto focus image into the camera; and determining strobe control parameters that determine an illumination level and an effective exposure duration usable for inputting an auto focus image into the camera during the continuous motion using the strobe illumination, wherein the strobe illumination level and exposure duration provide at least approximately the same total exposure illumination energy as the continuous illumination.

39. The method of claim 38, wherein the control system portion automatically determines the strobe control parameters based on the total exposure illumination energy provided by the continuous illumination.

40. The method of claim 39, wherein the control system portion automatically determines the strobe duration such that the motion along the focus axis during the strobe duration is at most equal to at least one of a) a predetermined exposure motion limit along the focus axis, b) 0.25 times the predetermined spacing limit, c) 0.5 microns, and d) 0.25 microns.

41. The method of claim 38, further comprising providing a training mode demonstration that automatically executes operations substantially functionally similar to the determined operations and displays an image acquired at the resulting determined estimated best focus position that is at least approximately the best focus position for user evaluation.

42. The method of claim 22, the method further comprising providing operations that, based at least partially on the estimated best focus position, automatically:

determine a shorter auto focus image range;
   determine a shorter auto focus motion; the shorter auto focus motion including traversing the shorter focus image range along the focus axis direction using continuous motion;
   use the determined illumination level and exposure duration and determine a repetitive inputting of respective auto focus images and outputting of respective data for a plurality of reduced readout pixel sets corresponding to a plurality of auto focus images distributed along the shorter focus image range during the continuous motion, each of the respective auto focus images having an effective exposure time and exposure duration;
   determine respective positions along the focus axis for at least some of the plurality of auto focus images distributed along the shorter focus image range; and
   determine a refined estimated best focus position that is at least approximately the best focus position usable for inspecting the region of interest of a workpiece based on at least some of the data for a plurality of reduced readout pixel sets and at least some of the respective positions along the focus axis for at least some of the plurality of auto focus images distributed along the shorter focus image range;
   wherein the operations performed over the shorter focus image range provide a shorter maximum spacing, the refined estimated best focus position is relatively less approximate, and the refined estimated best focus position is used for inspecting the workpiece, at least in the region of interest.

43. The method of claim 22, wherein method further comprises providing operations that set the focus axis position at the estimated best focus position, acquire an inspection image at that position, and use that inspection image for inspecting the workpiece, at least in the region of interest.

44. The method of claim 22, wherein the method further comprises providing operations that set the estimated best focus position that is at least approximately the best focus position as a feature coordinate value for a feature to be inspected in the region of interest without actually setting the focus axis position of the precision machine vision inspection system at that position.

45. The method of claim 22, wherein the method further comprises providing operations that select the respective reduced readout pixel set data having the respective position along the focus axis that is closest to the estimated best focus position, and use that respective reduced readout pixel set data for inspecting the workpiece in the region of interest without actually setting the focus axis position of the precision machine vision inspection system at that estimated best focus position.

46. The method of claim 22, further comprising generating and storing the set of machine control instructions based on the method.

47. The method of claim 22, further comprising providing a demonstration sequence in the training mode that automatically executes operations substantially functionally similar to the determined operations and displays an image acquired at the resulting estimated best focus position for user evaluation.

48. The method of claim 47, wherein the graphical user interface displays a control widget operable by a user to trigger the demonstration sequence.

* * * * *